United States Patent [19]
Kiryuscheva et al.

[11] Patent Number: 5,859,947
[45] Date of Patent: Jan. 12, 1999

[54] POSITIONING DEVICES AND A METHOD AND POSITIONING DEVICE FOR ALIGNING AN OPTICAL FIBER WITH AN OPTICAL BEAM

[75] Inventors: Irina Kiryuscheva, Rehovot; Emanuel Marom, Tel Aviv; David Mendlovic, Petach-Tikvah; Naim Conforti, Holon, all of Israel

[73] Assignee: Ramot University Authority for Applied Research & Industrial Development Ltd., Tel Aviv, Israel

[21] Appl. No.: 809,870
[22] PCT Filed: Sep. 26, 1995
[86] PCT No.: PCT/US95/12165
§ 371 Date: Jun. 4, 1997
§ 102(e) Date: Jun. 4, 1997
[87] PCT Pub. No.: WO96/10699
PCT Pub. Date: Apr. 11, 1996

[30] Foreign Application Priority Data

Oct. 2, 1994 [IL] Israel ........................................ 111124

[51] Int. Cl.[6] ............................... G02B 6/00; F16B 7/10; F16D 3/00; F16C 1/04
[52] U.S. Cl. .............................. 385/136; 385/90; 403/52; 403/57; 403/59; 464/147; 356/153
[58] Field of Search ................................. 385/90, 72, 136, 385/137, 139, 147; 403/52, 57, 59; 464/147, 96; 29/434; 228/135, 139; 356/153

[56] References Cited

U.S. PATENT DOCUMENTS

| | | | |
|---|---|---|---|
| 4,128,352 | 12/1978 | Newell | 403/57 |
| 4,542,956 | 9/1985 | McCrickerd | 385/136 |
| 4,721,357 | 1/1988 | Kovalchick et al. | 385/139 |
| 5,004,205 | 4/1991 | Brown et al. | 403/57 |
| 5,101,681 | 4/1992 | Shpigel | 403/57 |

Primary Examiner—Hemang Sanghavi
Attorney, Agent, or Firm—Mark M. Friedman

[57] ABSTRACT

A positioning device (500) for positioning workpieces along translations and through angular rotations about two or more axes of rotation. In particular, the positioning devices (500) can be employed in method for aligning an optical fiber (510) with an optical beam such that the axis of the optical fiber (510) is aligned coincident to the axis of the optical beam and the endface (508) of the optical fiber (510) is deployed at the global maximum along the axis of the optical beam. The positioning devices are for use laser-to-fiber set-ups, laser-to-spatial filter set-ups, fiber-to-fiber set-ups and the like.

23 Claims, 16 Drawing Sheets

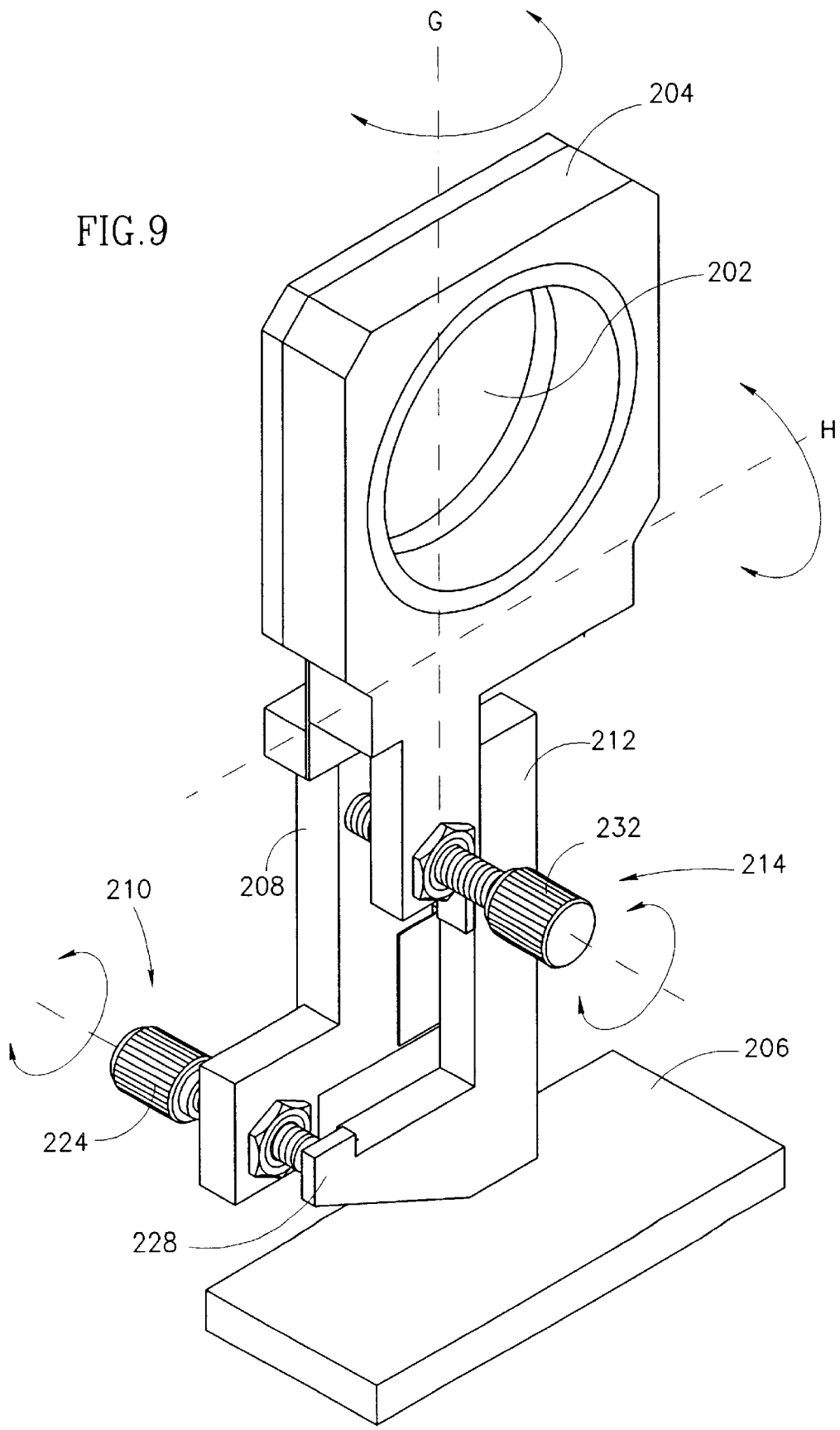

POSITIONING DEVICES AND A METHOD AND POSITIONING DEVICE FOR ALIGNING AN OPTICAL FIBER WITH AN OPTICAL BEAM

FIELD AND BACKGROUND OF THE INVENTION

The present invention relates to positioning devices for positioning workpieces in general. In particular, the present invention relates to positioning devices for positioning workpieces along translations and through angular rotations about two or more axes of rotation. The present invention also relates to methods and devices for coupling or launching an optical beam into an optical fiber or spatial filter in general. In particular, the present invention relates to devices for aligning an optical fiber with a laser beam in a laser-to-fiber set-up and an optical fiber with an optical beam issued by an optical fiber in a fiber-to-fiber set-up.

There is a trend to miniaturization in many fields of science and technology which require workpieces to be positioned and aligned to a few microns and many times to sub-microns. Such fields include optics, microscopy, semi-conductor technology, micro-machining, the life sciences and others.

Recently, a number of sub-micron flexure devices have been developed to provide translation of workpieces and angular or rotational motion of workpieces. These devices enable motion through the deformation of one or more flexure elements, thereby overcoming the problems of friction and backlash and enabling high spatial resolution.

Flexure devices enabling displacement in two or three coordinate include, for example, U.S. Pat. No. 3,585,866 to Ensinger, U.S. Pat. No. 4,382,709 to Brown, U.S. Pat. No. 4,499,778 to Westhaver et al., U.S. Pat. No. 4,691,586 to van Leijenhorst, and the like. However, these devices suffer from the disadvantage that they do not provide independent displacement along different axes since their flexure hinges are not rigid and their deformations are not restricted to one axis.

Turning now to the field of fiber optics, it is well known that the coupling or launching of an optical beam into an optical fiber is problematic because of the small diameter, typically around 1 microns, of the optical fiber's core. It is also well known that two positional requirements determine the coupling efficiency between an optical beam and an optical fiber. First, that the axis of the optical fiber is aligned coincident to the axis of the optical beam. And second, that the endface of the optical fiber is deployed at the global maximum along the axis of the optical beam. In the case of coupling an optical beam issued by a laser, an objective lens is employed for focussing the laser beam to a spot with a diameter as close as possible to that of the optical fiber's core.

Several devices have attempted to achieve a high coupling efficiency in a laser-to-fiber set-up or a fiber-to-fiber set-up. Such devices are described in U.S. Pat. No. 5,208,888 to Steinblatt et al., U.S. Pat. No. 4,451,115 to Nicia et al., U.S. Pat. No. 4,445,753, US SIR H551 to Chaoui et al., and others. Generally speaking, these devices suffer from the disadvantage that the axis of the optical fiber is aligned coincident to the axis of an objective lens during the alignment procedure and not to the axis of the optical beam. This causes a drop in coupling efficiency in most cases because the axis of the optical beam is typically slightly off center from the axis of the objective lens.

There is therefore a need for positioning devices for positioning workpieces along translations and through angular rotations about two or more axes of rotation. In particular, the positioning devices can be employed for in a method for aligning an optical fiber with an optical beam such that the axis of the optical fiber is aligned coincident to the axis of the optical beam and the endface of the optical fiber is deployed at the global maximum along the axis of the optical beam. The positioning devices can be adapted for use in laser-to-fiber set-ups, laser-to-spatial filter set-ups, fiber-to-fiber set-ups and the like.

SUMMARY OF THE INVENTION

The present invention is for positioning devices for positioning workpieces along translations and through angular rotations about two or more axes of rotation. In particular, the positioning devices can be employed for in method for aligning an optical fiber with an optical beam such that the axis of the optical fiber is aligned coincident to the axis of the optical beam and the endface of the optical fiber is deployed at the global maximum along the axis of the optical beam. The positioning devices can be adapted for use in laser-to-fiber set-ups, laser-to-spatial filter set-ups, fiber-to-fiber set-ups and the like.

Generally speaking, the positioning devices use combinations of cross-shaped flexure connectors, each cross-shaped flexure connector providing an axis of rotation which is rigid and stable and providing only a single degree of rotation. The cross-shaped flexure connectors can be combined in one of two manners. The first manner being that their axes of rotation are mutually perpendicular, thereby realizing devices which providing co-ordinate independent angular rotation of a workpiece. The second manner being that their axes of rotation are parallel, thereby realizing devices providing translation of a workpiece. All in all, these devices provide independent displacement of each coordinate and have the further advantage of not requiring high precision elements to achieve high resolution movements.

Hence, there is provided according to a first aspect of the present invention, a positioning device for positioning a workpiece, the positioning device comprising: (a) a base; (b) an intermediate member; (c) a first cross-shaped flexure connector including a pair of substantially perpendicular planar flexure members, the intersection between the flexure members defining a first axis of rotation, the base and the intermediate member deployed in a substantially diametrically opposed fashion about the first cross-shaped flexure connector so as to pivot the intermediate member relative to the base about the first axis of rotation; (d) a first actuator for providing angular rotation of the intermediate member relative to the base about the first axis of rotation; (e) a workpiece holder for holding the workpiece; (f) a second cross-shaped flexure connector including a pair of substantially perpendicular planar flexure members, the intersection between the flexure members defining a second axis of rotation, the workpiece holder and the intermediate member deployed in a substantially diametrically opposed fashion about the second cross-shaped flexure connector so as to pivot the workpiece holder relative to the intermediate member about the second axis of rotation; and (g) a second actuator for providing angular rotation of the workpiece holder relative to the intermediate member about the second axis of rotation.

According to a further feature of the present invention, the first axis of rotation is substantially perpendicular to the second axis of rotation and wherein the first axis of rotation intersects the second axis of rotation.

According to a still further feature of the present invention, the workpiece has at least one axis of symmetry which substantially coincides with at least one of the axes of rotation.

According to a yet still further feature of the present invention, the device further comprising: (i) a second intermediate member; (ii) a third cross-shaped flexure connector including a pair of substantially perpendicular planar flexure members, the intersection between the flexure members defining a third axis of rotation, the base and the second intermediate member deployed in a substantially diametrically opposed fashion about the third cross-shaped flexure connector so as to pivot the second intermediate member relative to the base about the third axis of rotation; and (iii) a third actuator for providing angular rotation of the second intermediate member relative to the base about the third axis of rotation According to a yet still father feature of the present invention, the third axis of rotation is substantially perpendicular to the first axis of rotation and wherein the third axis of rotation intersects the first axis of rotation.

According to a yet still further feature of the present invention, the third axis of rotation is substantially perpendicular to the second axis of rotation and wherein the third axis of rotation intersects the second axis of rotation.

According to a yet still farther feature of the present invention, the first axis of rotation, the second axis of rotation and the third axis of rotation are substantially mutually perpendicular to each other and wherein the first axis of rotation, the second axis of rotation and the third axis of rotation all intersect each other.

There is also provided according to a second aspect of the present invention, a positioning device for positioning a workpiece, the positioning device comprising: (a) a base; (b) a first member; (c) a first cross-shaped flexure connector including a pair of substantially perpendicular planar flexure members, the intersection between the flexure members defining a first axis of rotation, the first member and the base deployed in a substantially diametrically opposed fashion about the first cross-shaped flexure connector so as to pivot the first member relative to the base about the first axis of rotation; (d) a workpiece holder for holding the workpiece, the workpiece holder substantially parallel to the base; (e) a second cross-shaped flexure connector including a pair of substantially perpendicular planar flexure members, the intersection between the flexure members defining a second axis of rotation, the second axis of rotation being parallel to the first axis of rotation, the workpiece holder and the first member deployed in a substantially diametrically opposed fashion about the second cross-shaped flexure connector so as to pivot the workpiece holder relative to the first member about the second axis of rotation; (f) a second member substantially parallel with the first member; (g) a third cross-shaped flexure connector including a pair of substantially perpendicular planar flexure members, the intersection between the flexure members defining a third axis of rotation, the third axis of rotation being parallel to the first axis of rotation, second member and the workpiece holder deployed in a substantially diametrically opposed fashion about the third cross-shaped flexure connector so as to pivot the second member relative to the workpiece holder about the third axis of rotation; (h) a fourth cross-shaped flexure connector including a pair of substantially perpendicular planar flexure members, the intersection between the flexure members defining a fourth axis of rotation, the fourth axis of rotation being parallel to the first axis of rotation, the base and the second member deployed in a substantially diametrically opposed fashion about the fourth cross-shaped flexure connector so as to pivot the second member relative to the base about the fourth axis of rotation; and (i) a actuator for providing a translatory movement of the workpiece holder relative to the base.

According to a further feature of the present invention, the first member and the second member are of substantially the same length so as to facilitate a curvilinear translation of a plane associated with the workpiece.

According to a further feature of the present invention, the first member and the second member are of substantially different lengths so as to facilitate a rectilinear translation of a point associated with the workpiece.

There is also provided according to a third aspect of the present invention, a positioning device for aligning an optical fiber with an optical beam, the positioning device comprising: (a) an optical device holder for holding an optical device issuing an optical beam having an optical axis; and (b) an optical fiber sub-assembly including: (i) an optical fiber holder for holding an end of the optical fiber so as to provide an endface for capturing at least a portion of the optical beam, (ii) a yaw positioner for adjusting a yaw aspect of the optical fiber relative to the optical beam, (iii) a pitch positioner for adjusting a pitch aspect of the optical fiber relative to the optical beam and (iv) a rectilinear translation positioner for providing a rectilinear translation of the endface, the rectilinear translation positioner associated with the yaw positioner such that the rectilinear translation is relative to the yaw aspect, and the rectilinear translation positioner associated with the pitch positioner such that the rectilinear translation is relative to the pitch aspect.

According to a further feature of the present invention, the yaw positioner includes a cross-shaped flexure connector.

According to a still further feature of the present invention, the pitch positioner includes a cross-shaped flexure connector.

According to a yet still further feature of the present invention, the rectilinear translation positioner includes at least one cross-shaped flexure connector.

According to a yet still further feature of the present invention, the endface substantially lies at the intersection between the axis of rotation of the pitch positioner and the axis of rotation of the yaw positioner.

According to a yet still further feature of the present invention, the device further comprising a pitch positioner for adjusting the pitch aspect of the optical beam relative to the optical fiber sub-assembly.

According to a yet still further feature of the present invention, the device further comprising a yaw positioner for adjusting the yaw aspect of the optical beam relative to the optical fiber sub-assembly.

According to a yet still further feature of the present invention, the device further comprising a translation positioner for translatory movement of the optical beam relative to the optical fiber sub-assembly.

There is also provided according to a fourth aspect of the present invention, a method for aligning an optical fiber with an optical beam, the method comprising the steps of: (a) positioning the optical fiber at an arbitrary position relative to the optical beam; (b) adjusting the alignment between the optical fiber and the optical beam such that the optical fiber is located at a position indicative of a local maximum of the optical beam; (c) deploying the optical fiber to a new position by a displacement of the optical fiber relative to the optical beam along a path passing through the local maximum from step (b); (d) adjusting the alignment between the optical fiber and the optical beam at the new position by angular rotation of the optical fiber relative to the optical beam about the local maximum from step (b) such that the axis of the optical fiber is substantially coincident to the axis of the optical beam; and (e) deploying the optical fiber at the global maximum along the axis of the optical beam by displacing the optical fiber along the axis of the optical beam.

According to a further feature of the present invention, the step of adjusting the alignment between the optical fiber and the optical beam is achieved by translatory movement of the optical beam.

According to a still further feature of the present invention, the step of adjusting the alignment between the optical fiber and the optical beam is achieved by translatory movement of the optical fiber.

According to a yet still further feature of the present invention, the step of adjusting the alignment between the optical fiber and the optical beam is achieved by angular rotation of the objective lens.

According to a yet still further feature of the present invention, the step of adjusting the alignment between the optical fiber and the optical beam is achieved by angular rotation of the optical fiber.

BRIEF DESCRIPTION OF THE DRAWINGS

The invention is herein described, by way of example only, with reference to the accompanying drawings, wherein:

FIG. 9 is a front perspective view of a second embodiment of a positioning device, constructed and operative according to the teachings of the present invention, for providing dual axis angular rotation of a workpiece;

DESCRIPTION OF THE PREFERRED EMBODIMENTS

The present invention is of positioning devices for positioning workpieces along a translation and through an angular rotation about two or more axes of rotation. The positioning devices can be employed in a method for aligning an optical fiber with an optical beam such that the axis of the optical fiber is aligned coincident to the axis of the optical beam and the endface of the optical fiber is deployed at the global maximum along the axis of the optical beam, thereby ensuring a high coupling efficiency.

The principles and operation of the positioning devices according to the present invention may be better understood with reference to the drawings and the accompanying description.

Figure 1:
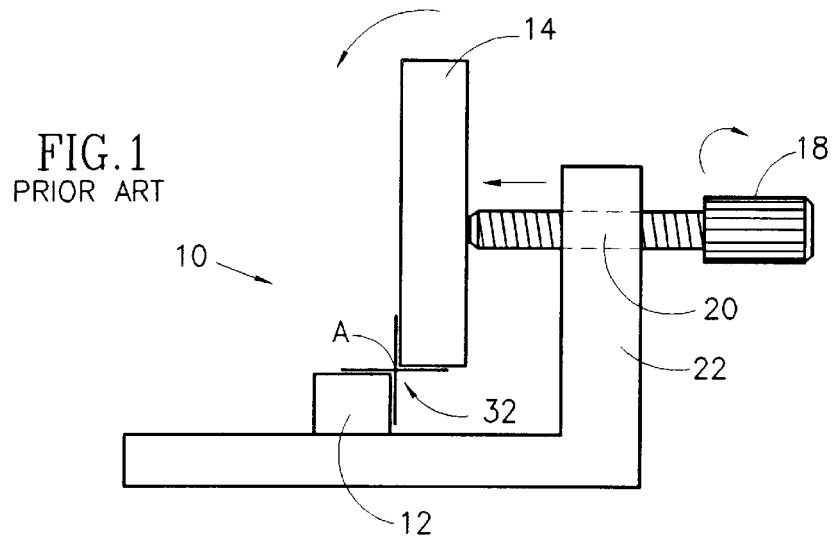
FIG. 1 is a schematic side view of a first conventional positioning device, including a cross-shaped flexure connector, for providing single axis angular rotation of a workpiece.
Figure 2:
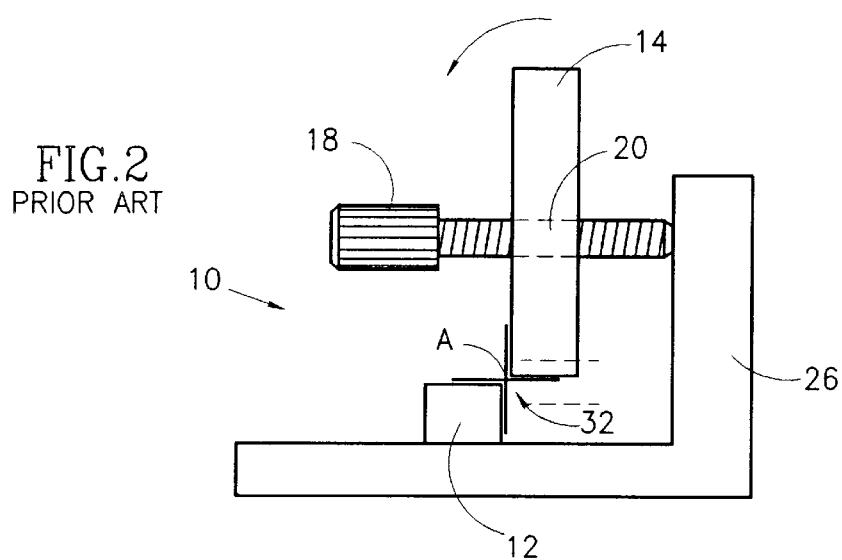
FIG. 2 is a schematic side view of a second conventional positioning device, including a cross-shaped flexural connector, for providing single axis angular rotation of a workpiece.

Referring now to the drawings, FIGS. 1 and 2 illustrate two conventional positioning devices including a cross-shaped flexure connector 10 for providing single axis angular rotation of a first member 12 relative to a second member 14 about an axis denoted A. For the sake of exposition, first member 12 will be regarded as a fixed base while second member 14 will be regarded as a workpiece holder for holding a workpiece. The degree of angular rotation of workpiece holder 14 relative to base 12 about axis of rotation A is regulated by an actuator 16. Actuator 16 can be a manually operated device, for example, a thumbscrew, or an electrically operated device, for example, a piezoelectric actuator. The final resolution of a positioning device including cross-shaped flexure connector 10 is determined by the pitch of the thumbscrew or the resolution of the piezoelectric actuator. Return motion and removal of backlash are typically provided by a spring (not shown).

As shown in FIG. 1, actuator 16 is implemented as a thumbscrew 18 traversing an aperture 20 provided in a member 22, extending from base 12 in a substantially parallel fashion to workpiece 12, such that the tip of thumbscrew 18 acts against workpiece holder 14 when advancing thumbscrew 18 in a forward direction toward workpiece holder 14. While, as shown in FIG. 2, thumbscrew 18 traverses an aperture 24 provided in workpiece holder 14 for acting against a stop 26 mounted on base 12. Other configurations of actuator 16 implemented as a thumbscrew are known in the art.

Figure 3:
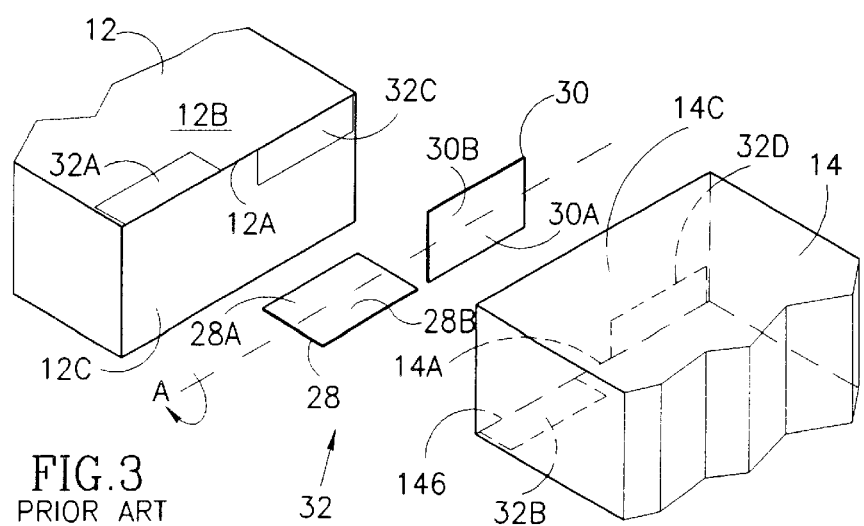
FIG. 3 is a schematic view of disassembled cross-shaped flexural connector used in the positioning devices of FIGS. 1 and 2.
Figure 4:
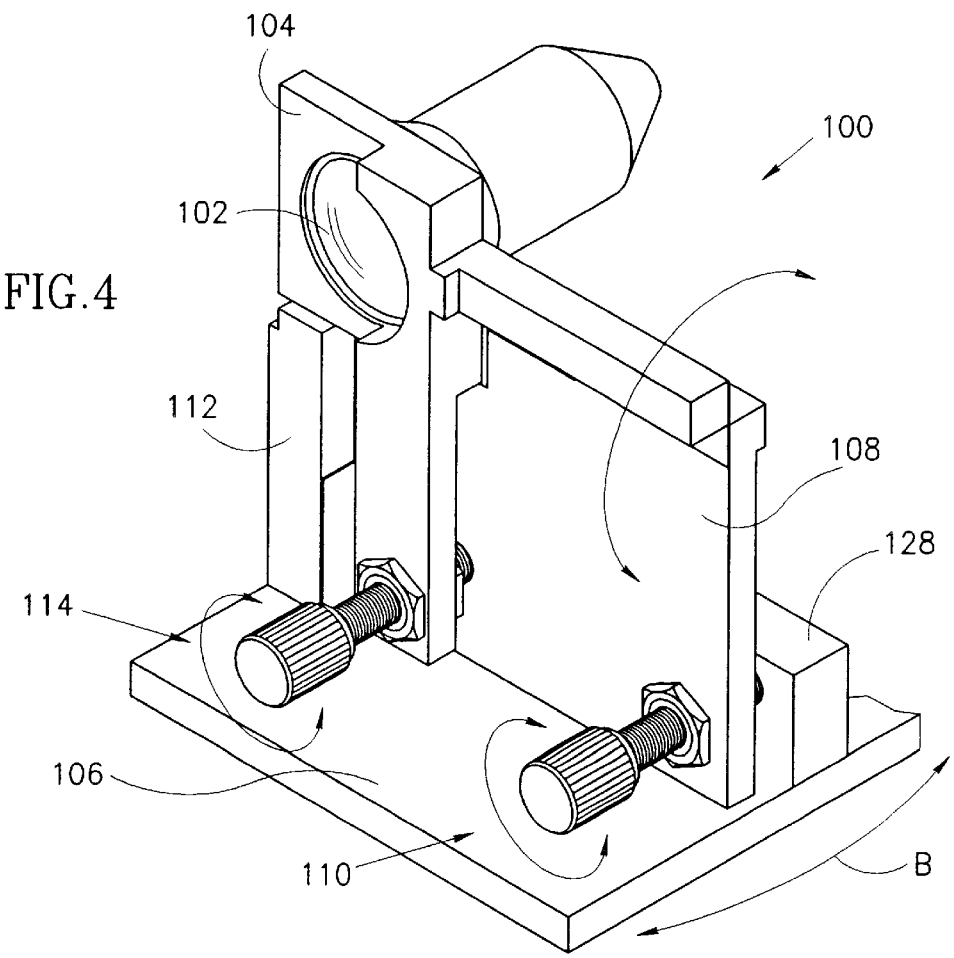
FIG. 4 is a front perspective view of a preferred embodiment of a positioning device, constructed and operative according to the teachings of the present invention, for providing dual axis angular rotation of a workpiece.
Figure 5:
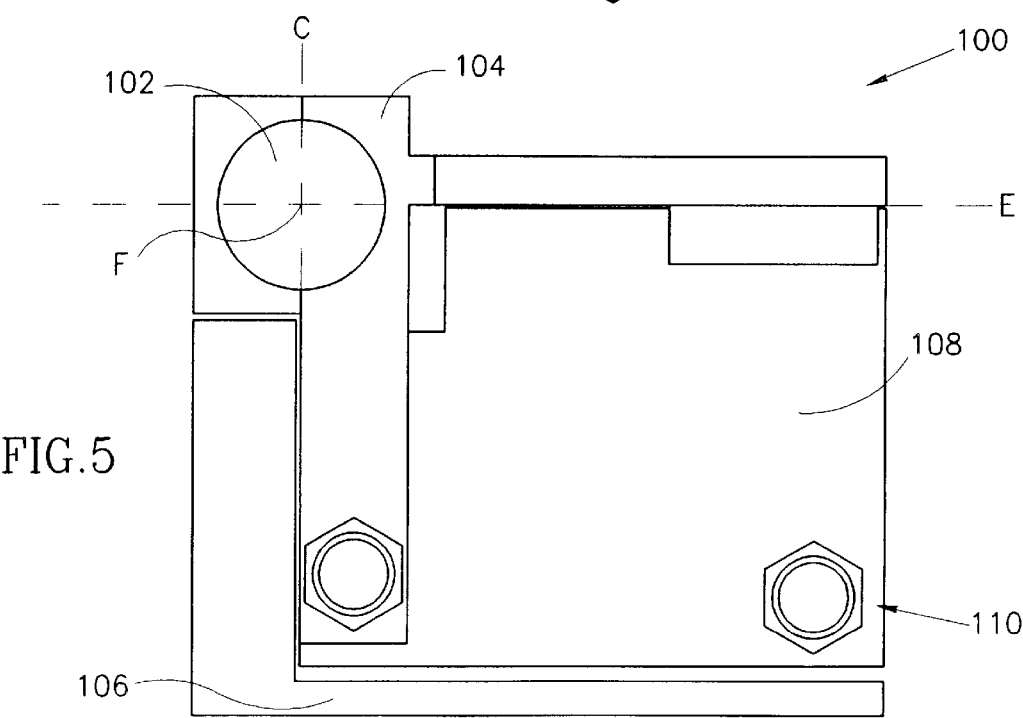
FIG. 5 is a front view of the positioning device of FIG. 4.
Figure 6:
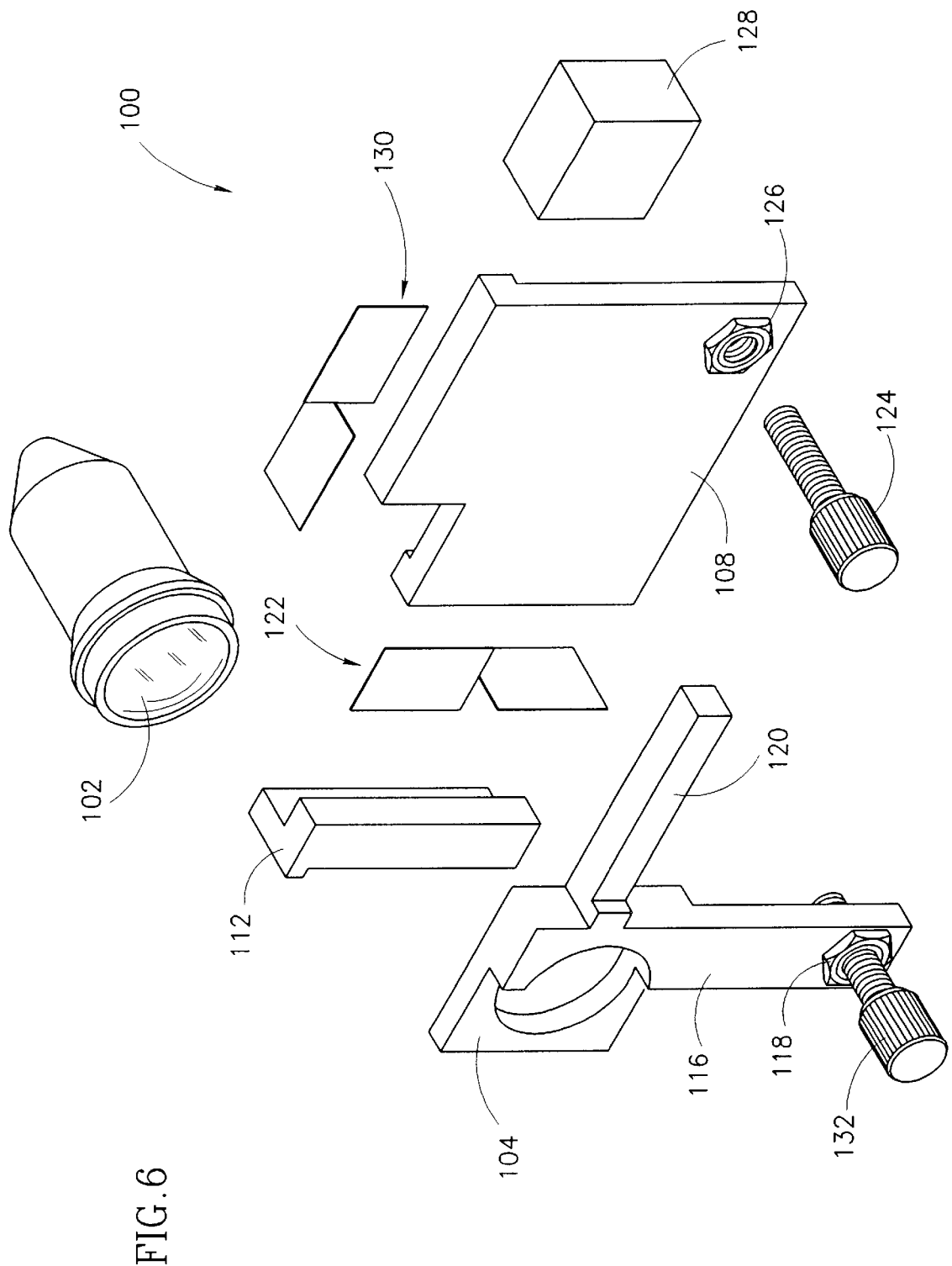
FIG. 6 is a front perspective view of a disassembled positioning device of FIG. 4.

As best seen in FIG. 3, cross-shaped flexure connector 10 includes a pair of substantially planar flexure members 28 and 30 lying in mutually perpendicular planes such that the line of intersection between these planes is axis of rotation A. Flexure members 28 and 30 can be fabricated as discrete members or can be fabricated as a combined unit. Furthermore, flexure members 28 and 30 can be fabricated from flat pieces of deformable material or from planar springs. Generally speaking, base 12 and workpiece holder 14 are deployed in a substantially diametrically opposing fashion about cross-shaped flexure connector 10 so as to pivot workpiece holder 14 relative to base 12 about axis of rotation A. Rigid connection between flexure members 28 and 30 and surfaces of base 12 and workpiece holder 14 can be achieved by adhering flexure members 28 and 30 to surfaces of base 12 and workpiece holder 14, by using screws, by welding corresponding surfaces, and the like.

Thus, axis of rotation A lies substantially coincident with a working edge 32 defined as the edge 12a of base 12 between a first substantially horizontal surface 12b of base 12 and a first substantially vertical surface 12c of base 12 which substantially adjoins the edge 14a between a first substantially horizontal surface 14b of workpiece holder 14 and a first substantially vertical surface 14c of workpiece holder 14. It should be noted that the edges of base 12 and workpiece holder 14 can also be rounded. As shown, one of flexure members 28 and 30, in this case, flexure member 28, horizontally traverses working edge 32 for rigidly connecting horizontal surface 12b to horizontal surface 14b while, the other flexure member, flexure member 30, vertically traverses working edge 32 for rigidly connecting vertical surface 12c to vertical surface 14c. In greater detail, a front portion 28a of flexure member 28 is connected to an area 32a of plane 12b while a rear portion 28b is connected to an area 32b of plane 14b. In a similar fashion, a bottom portion 30a is connected to area 32c of plane 12c while a top portion 30b is connected to area 32d of plane 14c.

It is a particular feature of the present invention to combine two or more cross-shaped flexure connectors 10 to realize positioning devices which provide sub-micron positioning resolution along with other such features as high repeatability, no backlash, etc. Broadly speaking, the present invention teaches two basic mechanisms depending on whether the axes of rotation of the cross-shaped flexure connectors are mutually perpendicular to each other or are parallel to each other. In the case that the axes of rotation are mutually perpendicular, devices are realized enabling angular rotation of a workpiece. In the case that the axes of rotation are parallel, devices are realized enabling translation of either a point or a plane associated with a workpiece. Furthermore, as can be readily appreciated, the basic mechanisms can be combined to provide a wide range of positioning devices including both translation and angular rotation.

With reference now to FIGS. 4–8, a positioning device, generally designated 100, constructed and operative according to the teachings of the present invention, is shown for dual axial angular rotation of a workpiece. Typically, the axes of rotation are mutually perpendicular to one another, for example, to achieve a pitch motion and a yaw motion, however, angles other than 90° can be subtended between the axes of rotation.

For the sake of exposition, the workpiece is depicted as an objective lens 102 held by a workpiece 104 employed, for example, for focussing a beam issued by a laser (not shown) to a focal point for capture by a fiber optic in a laser-to-fiber set-up. Alternatively, the workpiece can be a mirror, beam splitter and the like. However, it should be understood that the workpiece can be any of a wide range of workpieces depending on the application of positioning device 100 in the fields of optics, microscopy, semiconductor technology, micro-machining, the life sciences and the like.

Positioning of objective lens 102 about two axes of rotation relative to a base 106 is achieved by virtue of an intermediate member 108. As will become apparent hereinbelow, workpiece holder 104 includes a downward depending leg 116 having an aperture 118 and an arm 120. Thus, positioning device 100 includes a yaw positioner, generally designated 110, for adjusting the yaw aspect B of intermediate member 108 relative to an upward side wall 112 of base 106 about an axis of rotation C. Furthermore, positioning device 100 includes a pitch positioner, generally designated 114, for adjusting the pitch aspect D of workpiece holder 104 relative to intermediate member 108 about an axis of rotation E. It is a particular feature of positioning device 100 that axes of rotation C and E intersect at the center denoted F of objective lens 102 such that the combined actions of yaw positioner 110 and pitch positioner 114 are equivalent to mounting objective lens 102 on a ball joint.

The construction and operation of yaw positioner 110 is now described. Yaw positioner 110 includes a cross-shaped flexure connector 122 vertically deployed between intermediate member 108 and upward side wall 112 and a thumbscrew 124 traversing an aperture 126 provided in intermediate member 108 for acting against a stop 128 provided on base 106. Hence, thumbscrew 124 is used for regulating yaw aspect B of intermediate member 108 relative to upward side wall 112 about axis of rotation C defined by cross-shaped flexure connector 172.

Figure 7A:
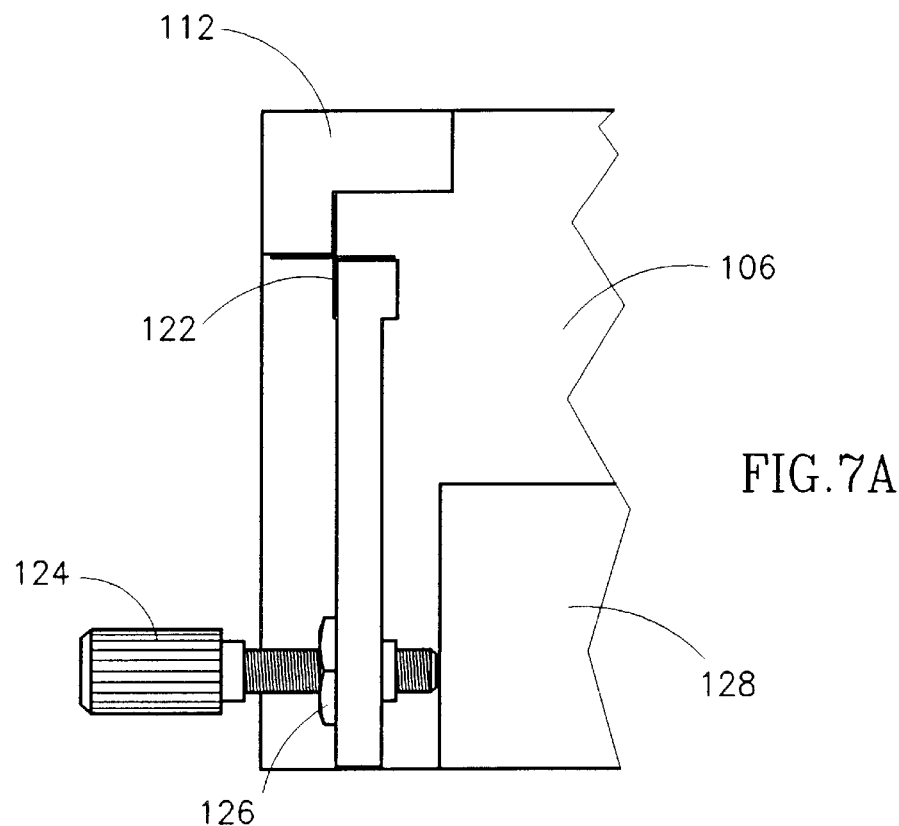
FIGS. 7a and 7b are top views of a workpiece being positioned from a first position to a second position about a first axis of rotation using the yaw positioner of the positioning device of FIG. 4.
Figure 7B:
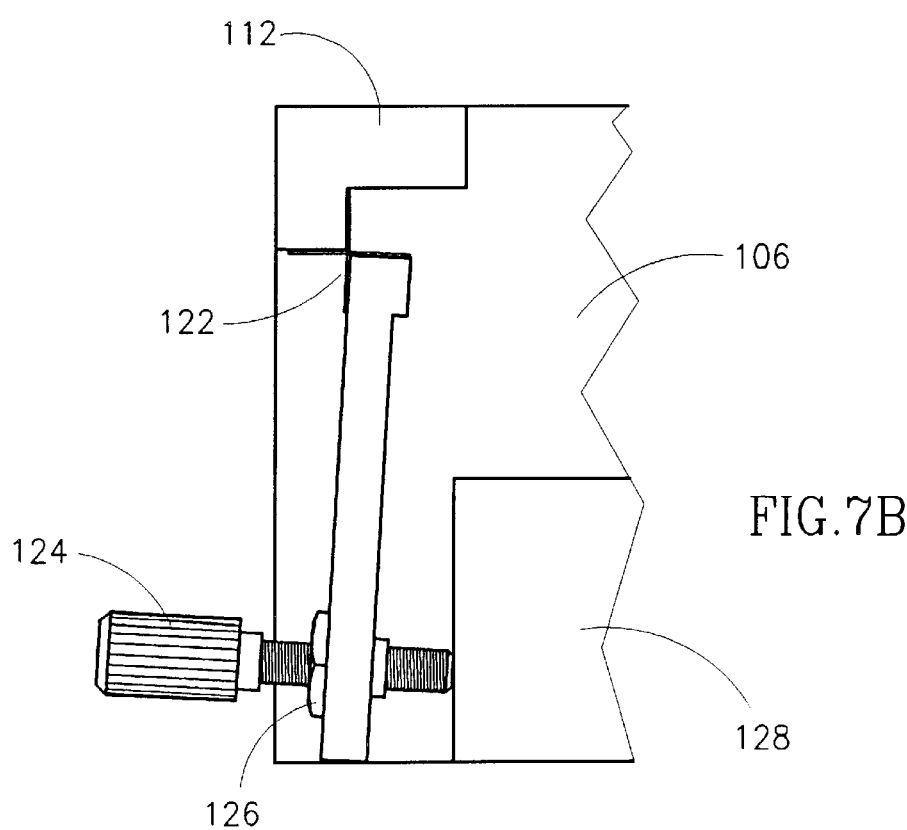

As shown in FIGS. 7a and 7b, advancement of thumbscrew 124 toward stop 128 inclines intermediate member 108 from a substantially perpendicular position relative to upward side wall 112 to an inclined position relative thereto.

Figure 8A:
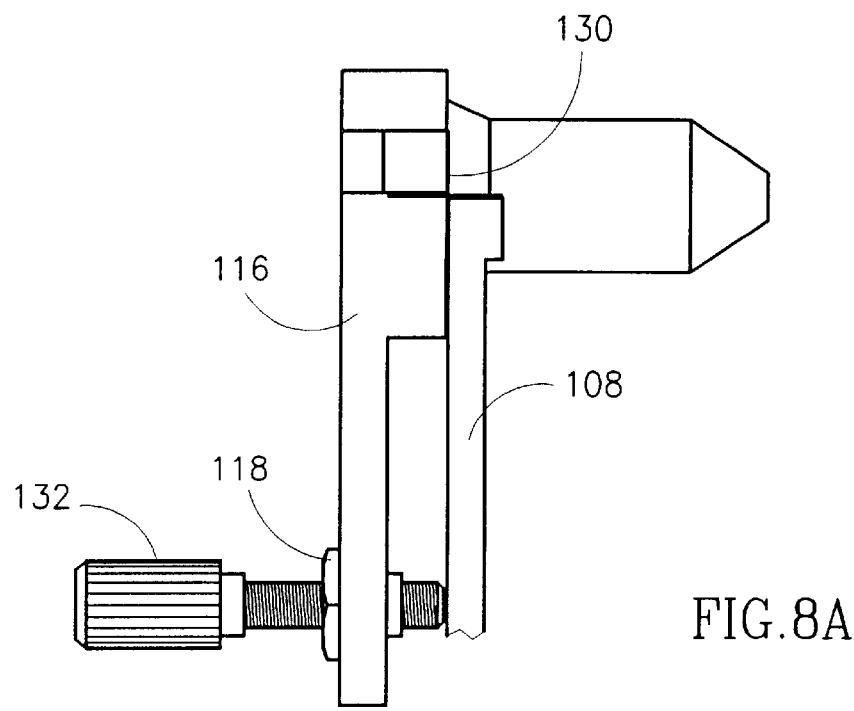
FIGS. 8a and 8b are side views of a workpiece being positioned from a first position to a second position about a second axis of rotation using the pitch positioner of the positioning device of FIG. 4.
Figure 8B:
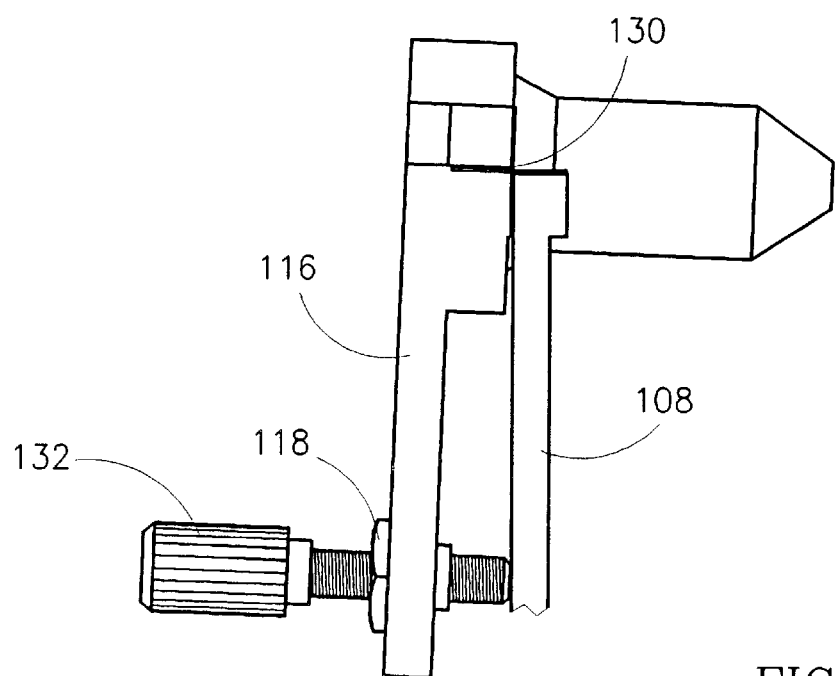

The construction and operation of pitch positioner 114 is now described. In a similar fashion, pitch positioner 114 includes a cross-shaped flexure connector 130 horizontally deployed between arm 120 and intermediate member 108 and a thumbscrew 132 traversing aperture 118 provided in intermediate member 108 for acting against a stop 128 provided on downward depending leg 116. Hence, thumbscrew 132 is used for regulating pitch aspect D of workpiece holder 104 relative to intermediate member 108 about axis of rotation E defined by cross-shaped flexure connector 130. As shown in FIGS. 8a and 8b, advancement of thumbscrew 132 toward intermediate member 108 inclines workpiece holder 104 from a substantially perpendicular position to an inclined position.

Figure 10:
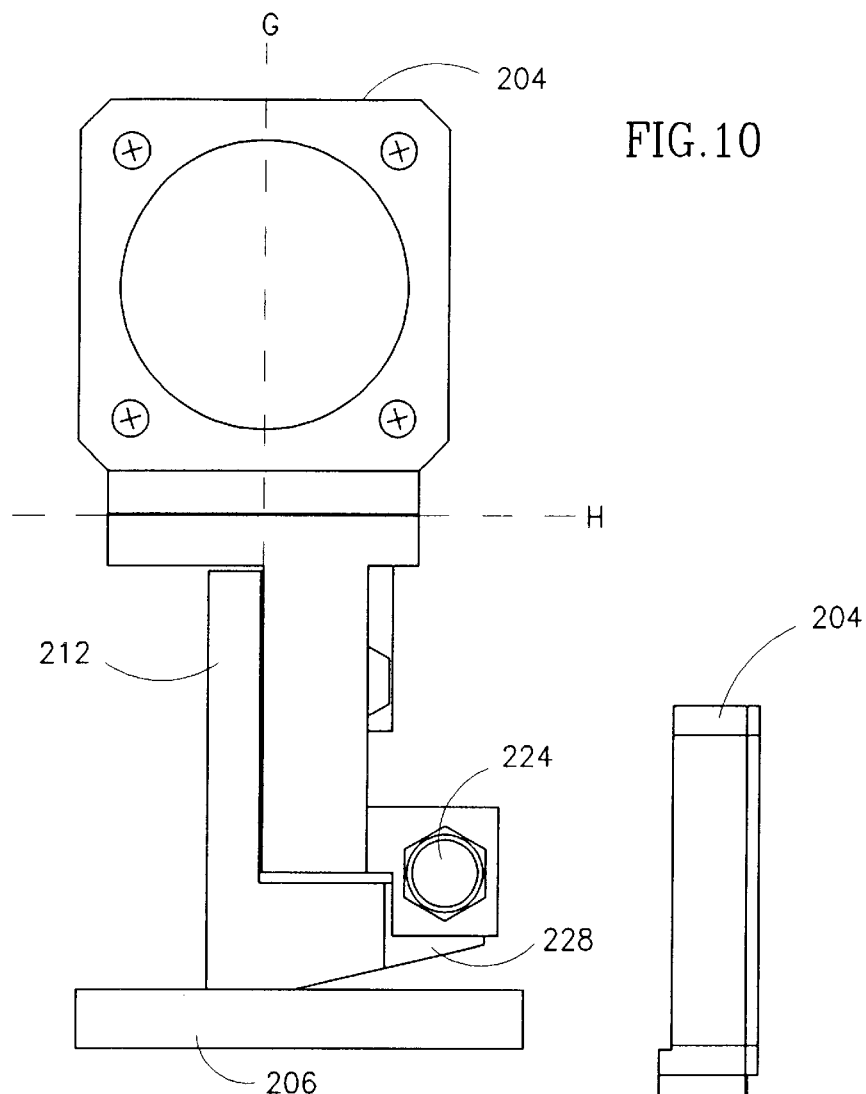
FIGS. 10 and 11 are front and side views of the positioning device of FIG. 9.
Figure 11:
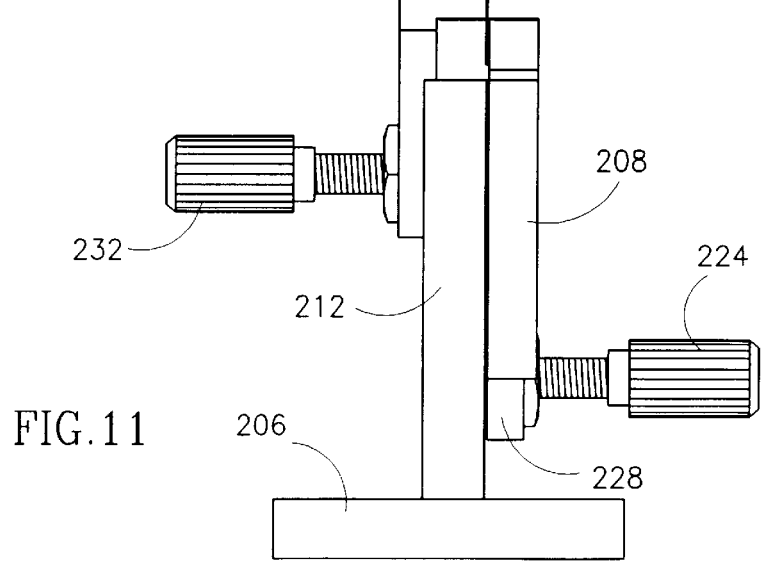

With reference now to FIGS. 9–11, a positioning device, generally designated 200, constructed and operative according to the teachings of the present invention, is shown for dual axial angular rotation of a workpiece. The construction and operation of positioning device 200 is similar to positioning device 100 so that similar elements are likewise numbered. As before, the axis of rotation denoted G of yaw positioner 210 intersects with the axis of rotation denoted H of pitch positioner 214. However, the difference between positioning device 200 and positioning device 100 is that the axis of rotation G of yaw positioner 210 coincides with the vertical axis of symmetry of objective element 202 while the axis of rotation H of pitch positioner 214 is offset relative to the horizontal axis of symmetry of objective element 202.

It should be noted that both positioning device 100 and positioning device 200 can be provided with a third axis of rotation so that a workpiece can also be manipulated about a roll axis of rotation as well as a yaw axis of rotation and a pitch axis of rotation. The roll aspect of rotation is achieved by providing a roll positioner including a cross-shaped flexure connector, a second intermediate member and a third actuator such that all three axes of rotation are mutually perpendicular to each other and all intersect each other.

Figure 12:
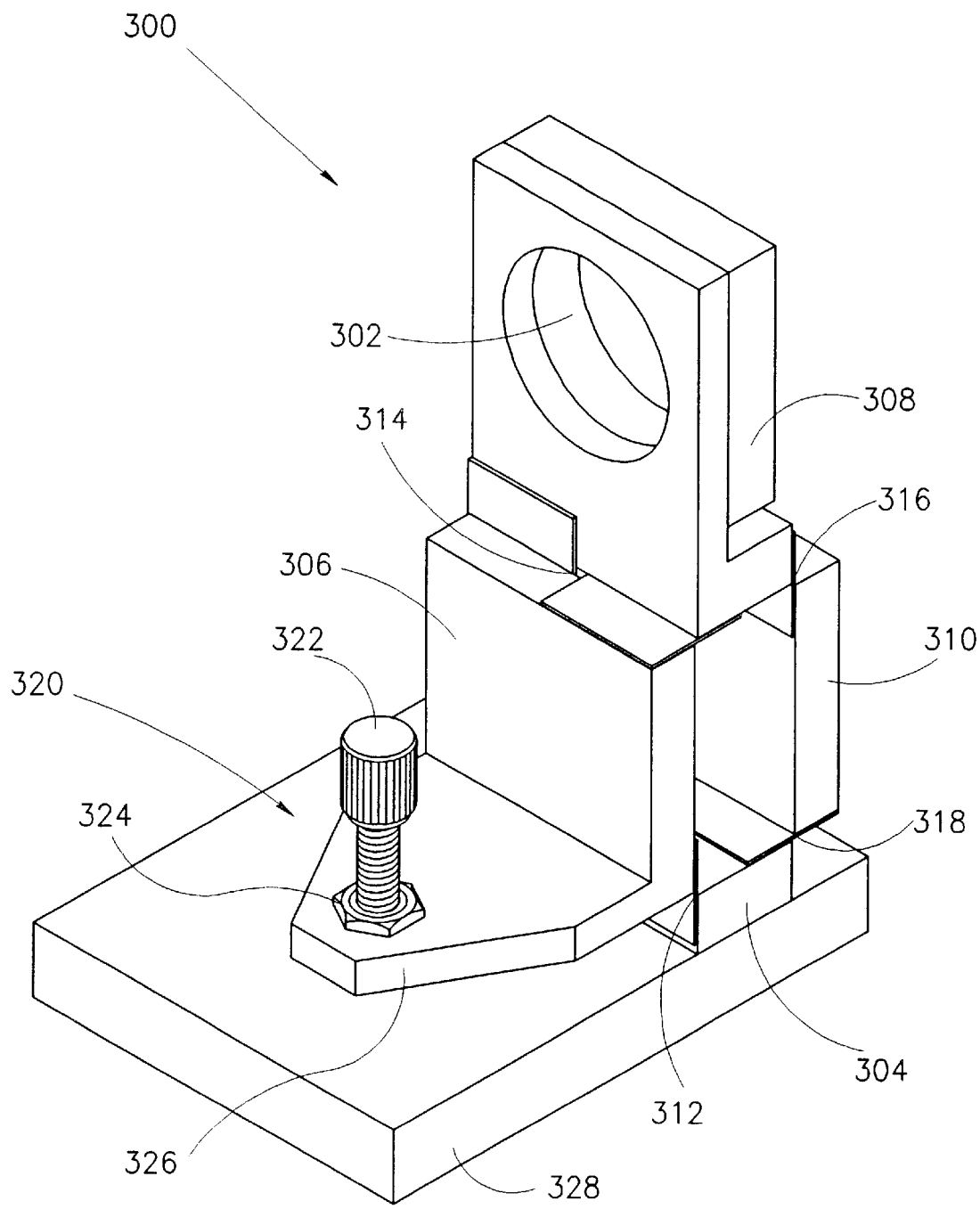
FIG. 12 is a front perspective view of a preferred embodiment of a positioning device, constructed and operative according to the teachings of the present invention, for providing a curvilinear translation of a plane associated with a workpiece while maintaining a constant aspect of the plane relative to a base.
Figure 13:
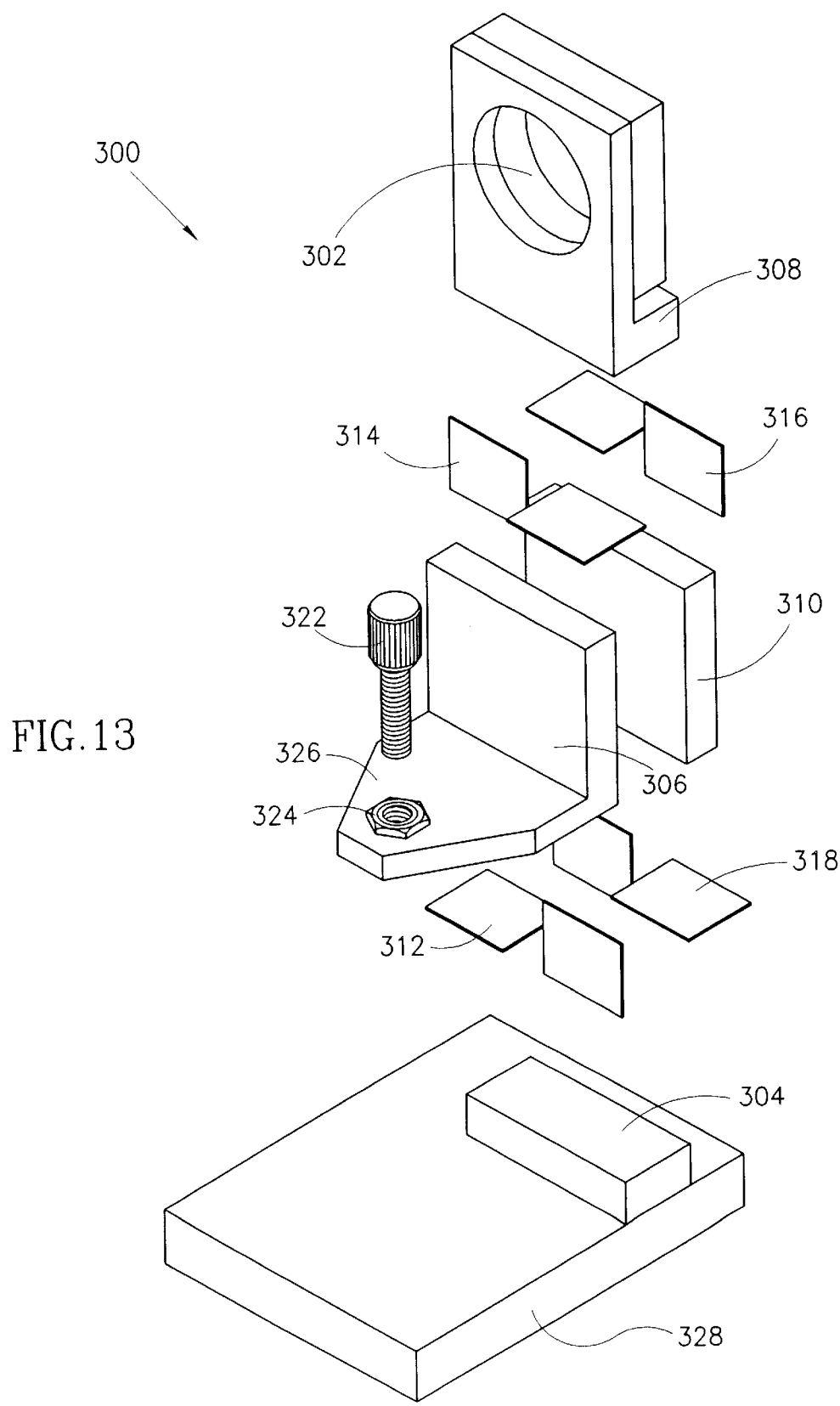
FIG. 13 is a front perspective view of a disassembled positioning device of FIG. 12.
Figure 14:
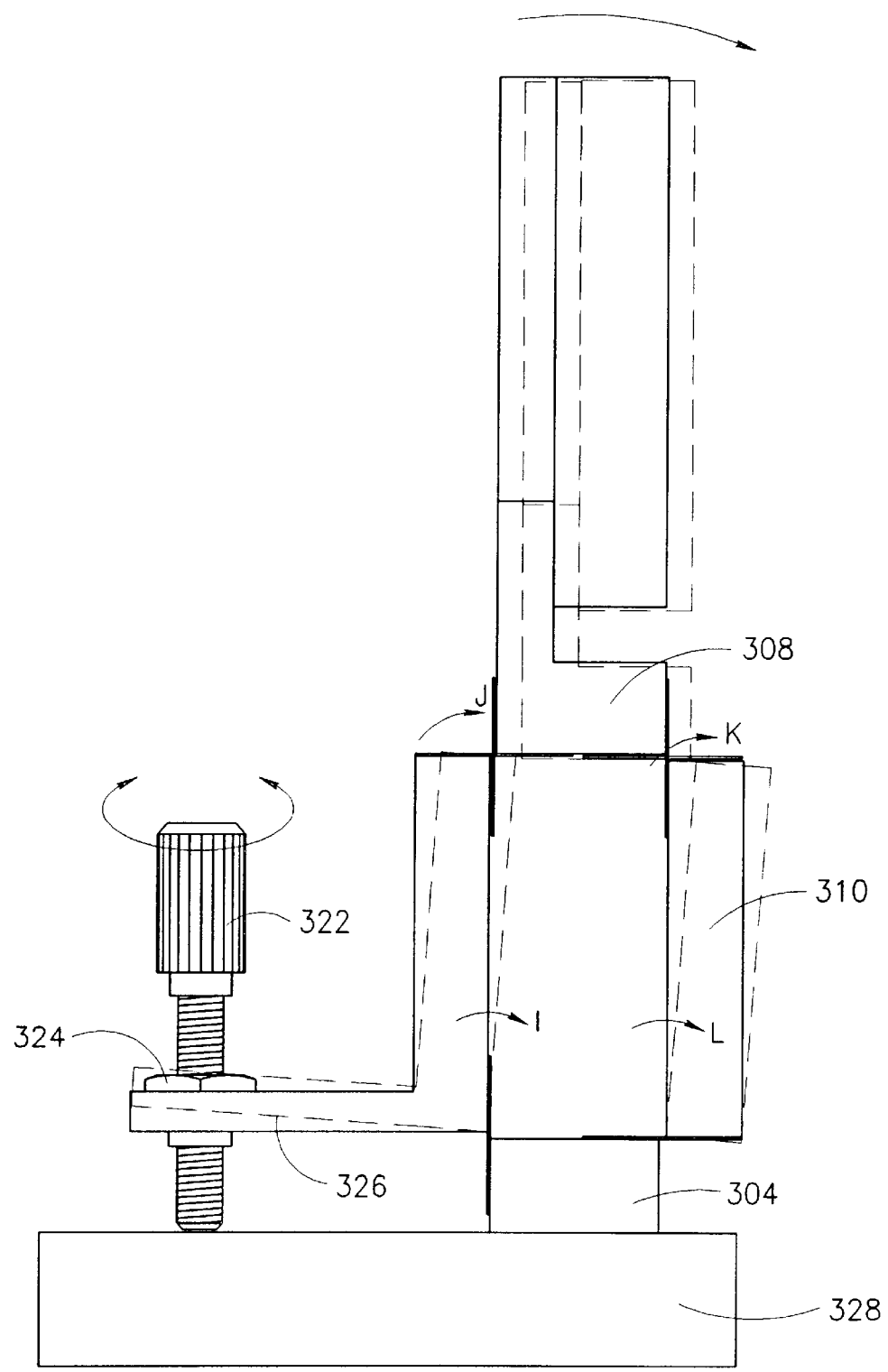
FIG. 14 is a side view of the plane associated with a workpiece being positioned from a first position to a second position by virtue of a parallelogram shifting of the positioning device of FIG. 12.
Figure 15:
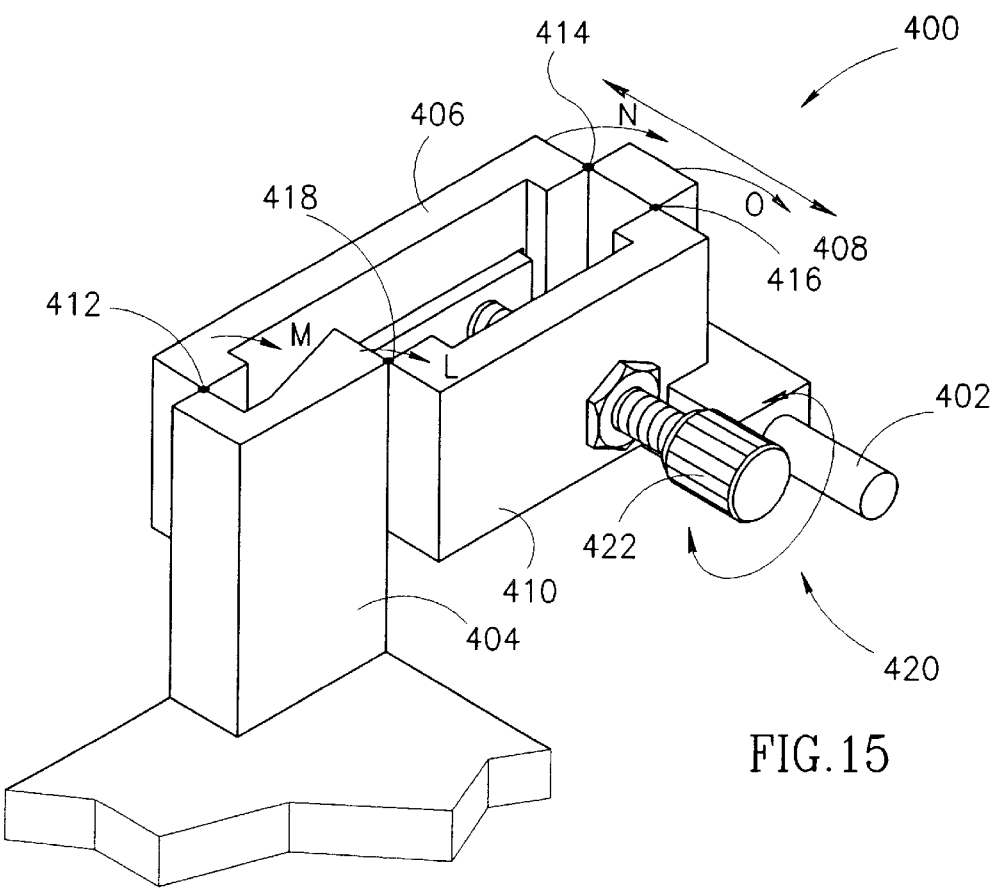
FIG. 15 is a front perspective view of a preferred embodiment of a positioning device, constructed and operative according to the teachings of the present invention, for providing a rectilinear translation of a point associated with a workpiece.

With reference now to FIGS. 12–14, a positioning device, generally designated 300, constructed and operative according to the teachings of the present invention, is shown for the translation of a workpiece. In particular, positioning device 300 is designed for the curvilinear translation of a plane associated with workpiece from a first position to a second position while maintaining the same aspect of the plane relative to a base in both positions. For the sake of exposition, the workpiece is once again depicted as an objective lens 302, however, as before, it should be readily understood that the workpiece can be any of a wide range of workpieces depending on the application of positioning device 300.

Hence, positioning device 300 includes a base 304, a first member 306, a workpiece holder 308 for holding objective lens 302 and a second member 310, four cross-shaped flexure connectors 312, 314, 316 and 318, and an actuator 320. In the present case, actuator 320 is implemented as thumbscrew 322 traversing through an aperture 324 provided in a leg 326 extending from first member 306 in a substantially horizontal fashion to base 304 such that the tip of thumbscrew 322 acts against a platform 328 on which base 304 is mounted.

Each of cross-shaped flexure connectors 312, 314, 316 and 318 include a pair of substantially perpendicular planar flexure members where the intersection between flexure members defines an axis of rotation as described hereinabove with reference to cross-shaped flexure connector 10. As can be clearly seen, first member 306 and base 304 are deployed in a substantially diametrically opposed fashion about cross-shaped flexure connector 312 so as to pivot first member 306 relative to base 304 about an axis of rotation I. In a similar fashion, workpiece holder 308 and first member 306 are deployed in a substantially diametrically opposed fashion about cross-shaped flexure connector 314 so as to pivot workpiece holder 308 relative to fit member 306 about an axis of rotation J parallel to axis of rotation I. In a similar fashion, second member 310 and workpiece holder 308 are deployed in a substantially diametrically opposed fashion about cross-shaped flexure connector 316 so as to pivot second member 310 relative to workpiece holder 308 about an axis of rotation K parallel to axis of rotation I. And lastly, base 304 and second member 310 are deployed in a substantially diametrically opposed fashion about cross-shaped flexure connector 318 so as to pivot second member 310 relative to base 304 about an axis of rotation L parallel to axis of rotation I.

All in all, base 304, first member 306, workpiece holder 308 and second member 310 establish a substantially rectangular structure when the angles subtended between adjacent sides are substantially 90° such that the curvilinear translation of objective lens 302 relative to base 304 is facilitated by virtue of a parallelogram shining of positioning device 300. The parallelogram shifting of positioning device 300 is effected by actuator 320 applying a moment about axis of rotation I. Hence, as shown in FIG. 14, advancement of thumbscrew 322 downward against platform 328 applies a clockwise moment about axis of rotation I such that positioning device 300 is parallelogram shifted from a substantially vertical position shown in solid lines to an inclined position shown in hashed lines.

With reference now to FIGS. 15–18, a positioning device, generally designated 400, constructed and operative according to the teachings of the present invention, is shown for translation a workpiece. In particular, positioning device 400 is designed for the rectilinear translation of a point of a workpiece from a first position to a second position along a straight line trajectory. For the sake of exposition, the workpiece is depicted as a fiber optic 402, however, as before, it should be readily understood that the workpiece can be any of a wide range of workpieces depending on the application of positioning device 400. For example, the selected point which moves along the straight line trajectory can be the endface 402a of fiber optic 402.

Hence, positioning device 400 includes a base 404, a first member 406, a workpiece holder 408 for holding fiber optic 402 and a second member 410, four cross-shaped flexure connectors 412, 414, 416 and 418, and an actuator 420. Cross-shaped flexure connectors 414 and 416 have a common horizontal flexure member due to the close physical proximity therebetween. In the present instance, actuator 420 is implemented as a thumbscrew 422 traversing through an aperture 424 provided in second member 410 such that the tip of thumbscrew 422 acts against an arm 426 extending from base 404.

Each of cross-shaped flexure connectors 412, 414, 416 and 418 include a pair of substantially perpendicular planar flexure members where the intersection between flexure members defines an axis of rotation as described hereinabove with reference to cross-shaped flexure connector 10. As can be clearly seen, first member 406 and base 404 are deployed in a substantially diametrically opposed fashion about cross-shaped flexure connector 412 so as to pivot first member 406 relative to base 404 about an axis of rotation M. In a similar fashion, workpiece holder 408 and first member 406 are deployed in a substantially diametrically opposed fashion about cross-shaped flexure connector 414 so as to pivot workpiece holder 408 relative to first member 406 about an axis of rotation N parallel to axis of rotation M. In a similar fashion, second member 410 and workpiece holder 408 are deployed in a substantially diametrically opposed fashion about cross-shaped flexure connector 416 so as to pivot second member 410 relative to workpiece holder 408 about an axis of rotation O parallel to axis of rotation M. And lastly, base 404 and second member 410 are deployed in a substantially diametrically opposed fashion about cross-shaped flexure connector 418 so as to pivot second member 410 relative to base 404 about an axis of rotation P parallel to axis of rotation M.

Figure 18:
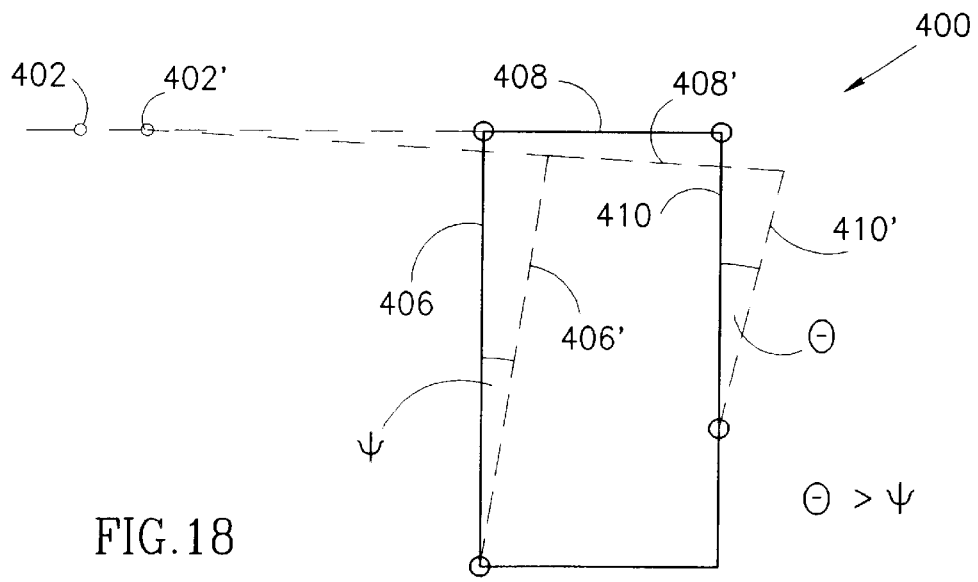
FIG. 18 is a schematic illustration of the rectilinear translation of the point shown in FIG. 17.
Figure 16:
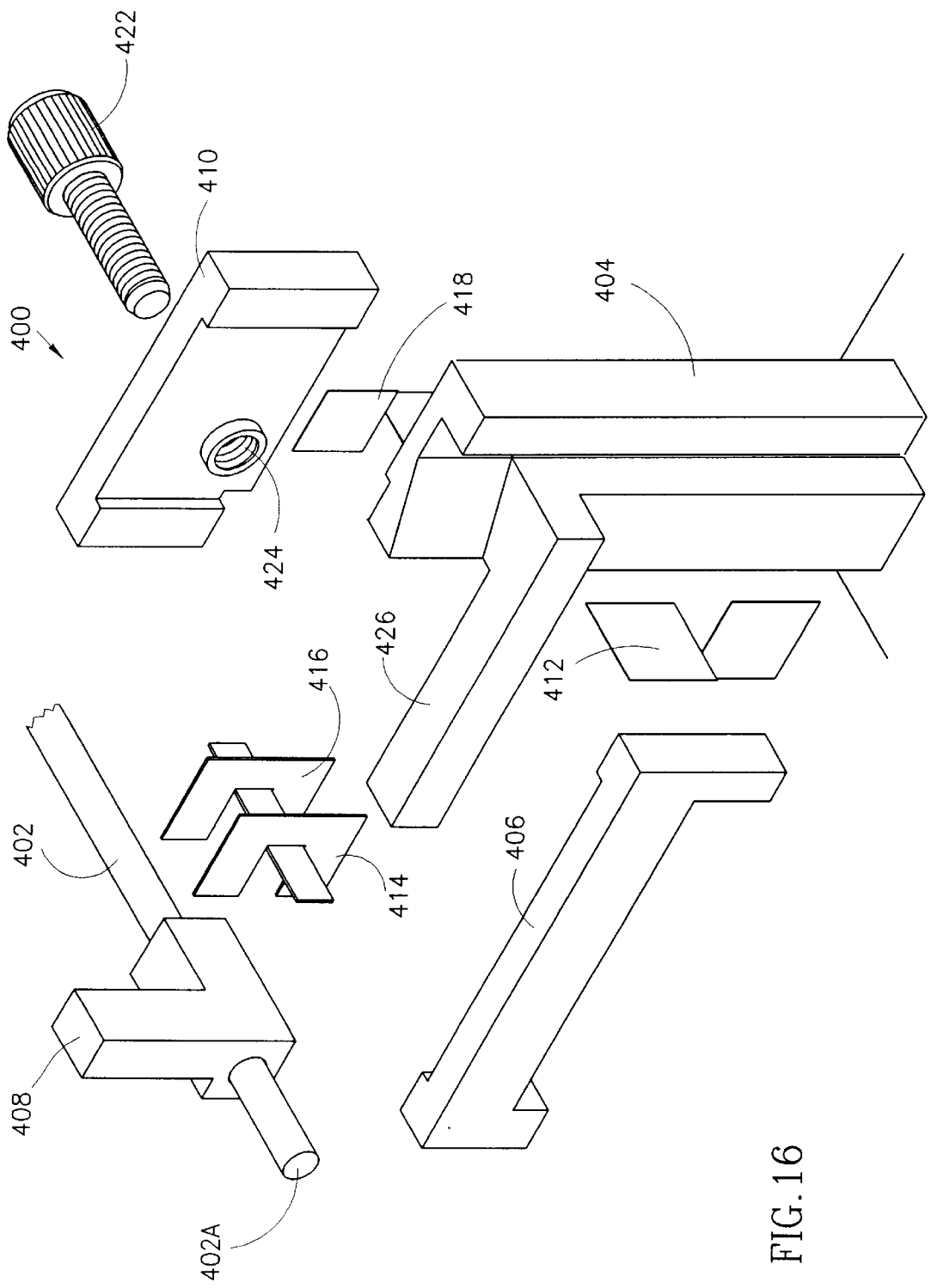
FIG. 16 is a front perspective view of a disassembled positioning device of FIG. 13.
Figure 17A:
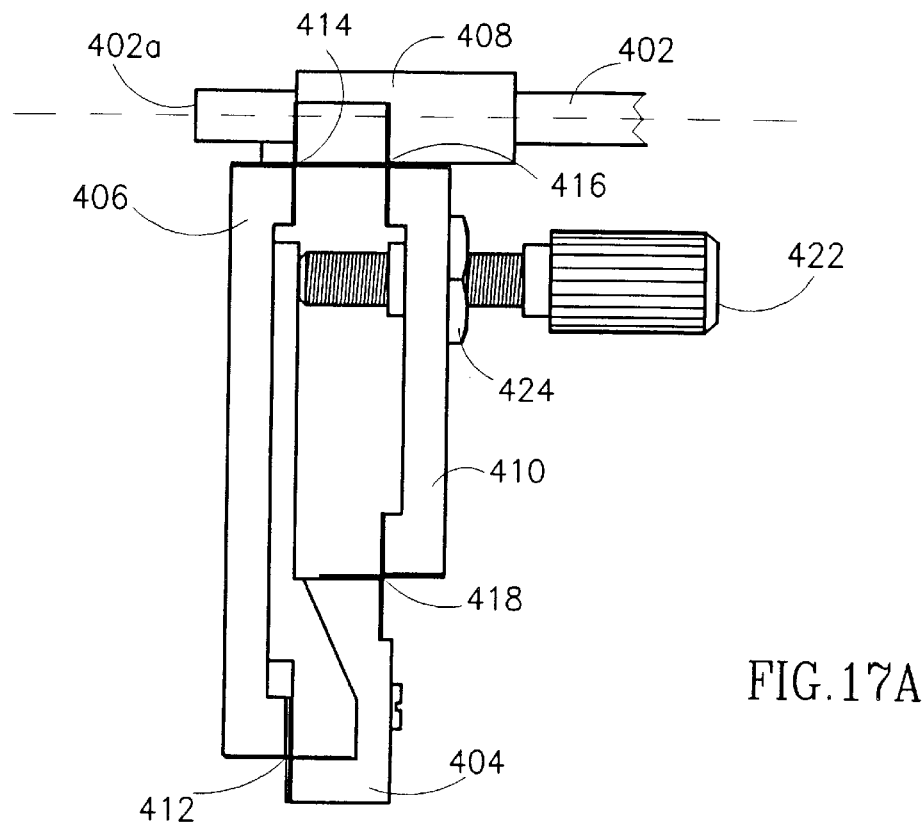
FIGS. 17a and 17b are plan views of a point associated with a workpiece being positioned from a first position to a second position along a rectilinear translation by virtue of the skewing of the positioning device of FIG. 15.
Figure 17B:
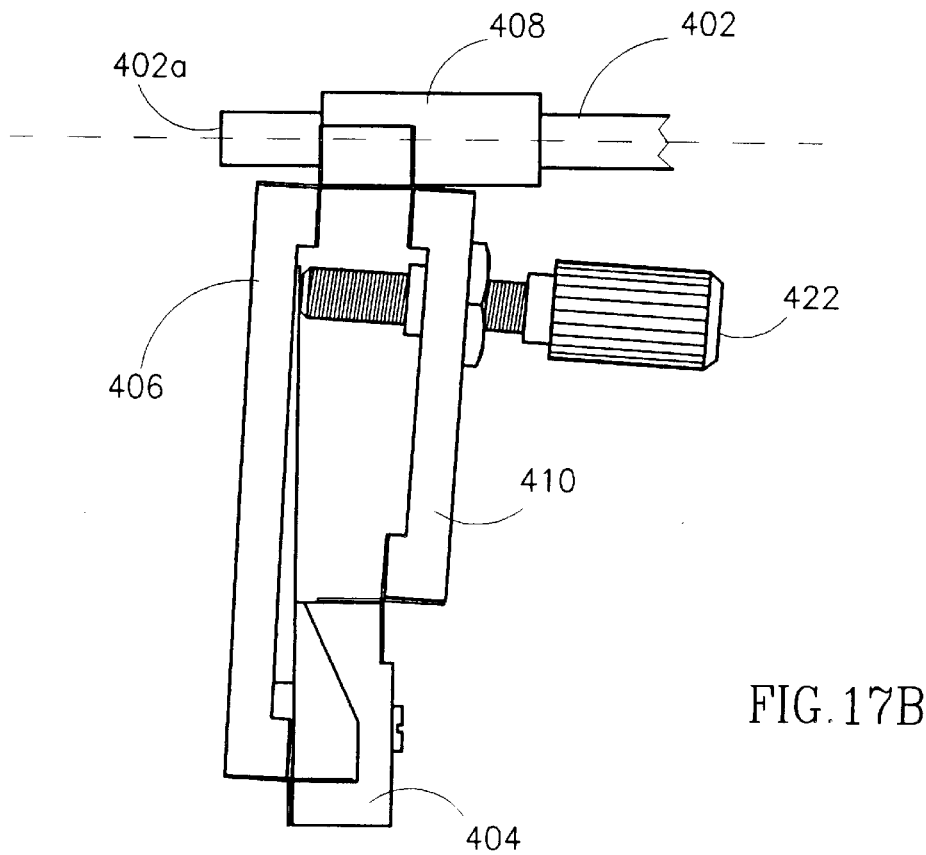

All base 404, first member 406, workpiece holder 408 and second member 410 establish a substantially rectangular structure when the angles subtended between adjacent sides are substantially 90°. However, the rectilinear translation of endface 402a of fiber optic 402 along a straight line trajectory is engineered by fabricating first member 406 and second member 410 of different lengths. In the present instance, first member 406 is longer than second member 406 while base 404 is provided as an L-shaped piece. Hence, as shown in FIGS. 17 and 18, advancement of thumbscrew 422 toward first member 406 applies a counterclockwise moment about axis of rotation M such that positioning device 400 is skewed from a substantially vertical position shown in solid lines to an inclined position shown in hashed lines. This skewing causes second member 410 to rotate through an angle θ about flexure connector 418 while first member 406 to rotate through an angle φ about flexure connector 412 where angle θ is greater than angle φ due to first member 406 being longer than second member 410. Hence, workpiece holder 408 is rendered inclined relative to base 404, thereby compensating at the selected point, namely, endface 402a, for the arcuate movement of positioning device 400 such that endface 402a, in erect, is displaced along a rectilinear translation.

Figure 19:
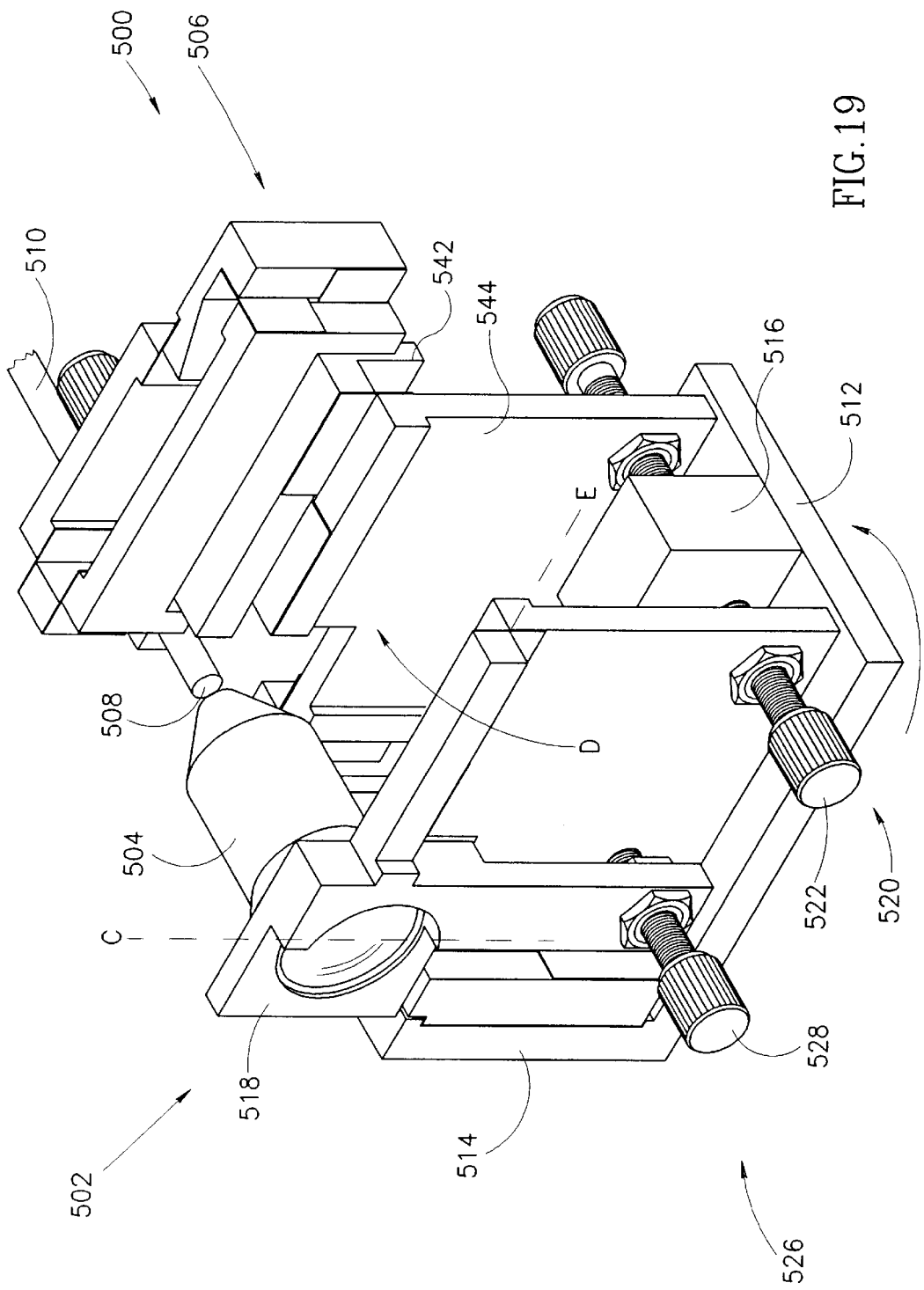
FIG. 19 is a front perspective view of a preferred embodiment of a positioning device, constructed and operative according to the teachings of the present invention, for aligning an optical fiber with an optical beam.
Figure 20:
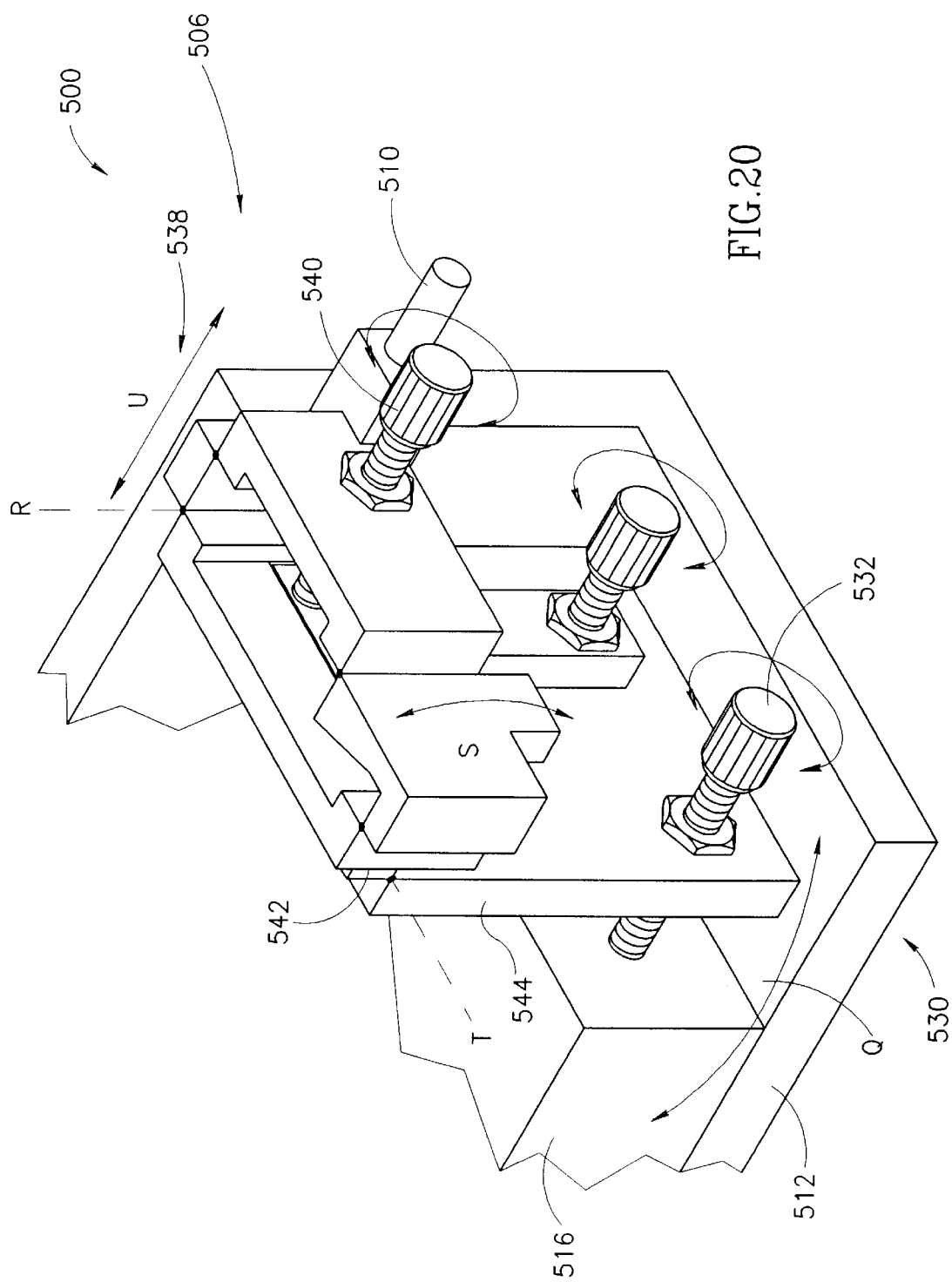
FIG. 20 is a rear perspective view of the positioning device of FIG. 19 depicting the adjustments of the optical fiber sub-assembly of the positioning device.

With reference now to FIGS. 19 and 20, a positioning device, generally designated 500, constructed and operative according to the teachings of the present invention, is shown for aligning an optical fiber with an optical beam. Generally speaking, positioning device 500 can be employed in a laser-to-fiber set-up or a laser-to-spatial filter set-up where the optical beam is issued by an objective lens employed for focussing a laser beam or in a fiber-to-fiber set-up where the optical beam is issued by an optical fiber. Hence, positioning device 500 can be employed for coupling a laser beam into an optical fiber or a spatial filter or, alternatively, for coupling a pair of optical fibers. For the sake of exposition only, positioning device 500 is described for aligning an optical fiber with an optical beam issued by an objective lens.

It is a particular feature of the present invention that positioning device 500 enables accurate positioning of an optical fiber relative to an optical beam by virtue of five degrees of freedom. As will become apparent from the description of the present invention hereinbelow, two of the five degrees of freedom are employed for gross adjustment between the optical fiber and the optical beam while the remaining three degrees of freedom are employed for fine adjustment therebetween. Gross adjustment of the set-up can be achieved by positioning either the optical beam or the optical fiber while fine adjustment of the set-up is achieved by positioning the optical fiber. In the present instance, gross adjustment of the set-up is preferably achieved by positioning of the optical beam.

Hence, positioning device 500 includes an optical device sub-assembly, generally designated 502, for positioning an optical beam issued by an objective lens 504 employed for focussing the beam of a laser (not shown) and an optical fiber sub-assembly, generally designated 506, for positioning an endface 508 of an optical fiber 510 for capturing the optical beam. Typically, objective lens 504 focusses the optical beam to a focal point having a diameter in the order of about 5 mm corresponding to the diameter of the core of optical fiber 510. The focal point is typically in the range of between about 2 mm and about 4 mm. Alternatively, optical device sub-assembly 502 can be adapted for positioning an optical beam issued by an optical fiber in a fiber-to-fiber set-up.

It is a particular feature of positioning device 500 that it is, in effect, a combination of basic mechanisms described hereinabove mounted on a common base 512 including a side wall 514 and a stop 516. In particular, optical device sub-assembly 502 has the same construction and mode of operation as a positioning device 100 while optical fiber sub-assembly 506 has the same construction and mode of operation as the combination of a positioning device 500 mounted on a positioning device 100.

Thus, optical device sub-assembly 502 includes three basic elements in a similar fashion to positioning device 100. First, an optical device holder 518 for holding objective lens 504. Second, a yaw positioner, generally designated 520 regulated by a screw 522 for adjusting yaw aspect B of the optical beam about axis of rotation C. And third, a pitch positioner, generally designated 524 regulated by a screw 526 for adjusting pitch aspect D of the optical beam about axis of rotation E. In effect, the combined actions of yaw positioner 520 and pitch positioner 524 are equivalent to mounting objective lens 504 on a ball joint mount, thereby rendering a translatory movement of the optical beam issued thereby relative to optical fiber sub-assembly 506. Alternatively, optical device sub-assembly 502 can be provided with dedicated translation positioners for translatory movement of the optical beam relative to optical fiber sub-assembly 506.

Turning now to optical fiber sub-assembly 506, optical fiber sub-assembly 506 includes four basic elements. First, an optical fiber holder 528 for holding optical fiber 510. Second, a yaw positioner, generally designated 530 regulated by a screw 532 for adjusting the yaw aspect Q of endface 508 about an axis of rotation denoted R and relative to the optical beam. Third, a pitch positioner, generally designated 534 regulated by a screw 536 for adjusting the pitch aspect S of endface 508 about an axis of rotation denoted T and relative to the optical beam. And fourth, a rectilinear translation positioner, generally designated 538, regulated by a screw 540 for providing translatory movement U of endface 508. Rectilinear translation positioner 538 is mounted on pitch positioner 534 by means of an arm 542, previously denoted 426 in FIG. 15, pivoted about an intermediate member 544 pivoted about upright side wall 514. It should be noted that endface 508 substantially lies over the intersection of axes of rotation R and T such that, on the one hand, the rectilinear translation of endface 508 is relative to pitch aspect S of arm 542 about axis of rotation T while, on the other hand, the rectilinear translation of endface 508 is relative to yaw aspect Q of intermediate member 544 about axis of rotation R.

Figure 21A:
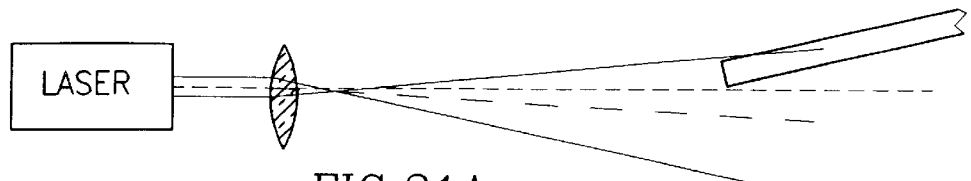
FIG. 21A–21E depicts a series of steps for aligning an optical beam with an optical device according to a method of the present invention.

The method for aligning endface 508 of optical fiber 510 with an optical beam using positioning device 500 such that the axis of optical fiber 510 is substantially coincident to the axis of the optical beam and endface 508 of optical fiber 510 is deployed at the global maximum along the axis of the optical beam is now described with reference to FIG. 21. The operator sets up positioning device 500 by mounting an objective lens 504 in optical device holder 508 and inserting optical fiber 510 into optical fiber holder 518 such that optical fiber 510 is positioned in an arbitrary position relative to the optical beam issuing from objective lens 504 as shown in FIG. 21a.

Figure 21B:
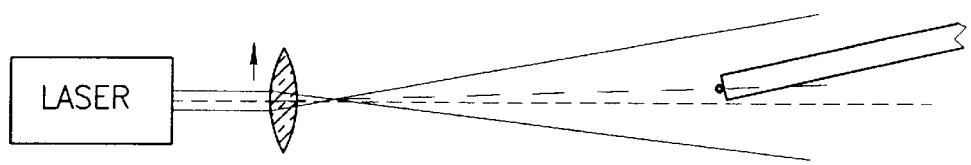

First, as shown in FIG. 21b, the operator effects the gross alignment between optical fiber 510 and the optical beam such that endface 508 is located at a local maximum of the optical beam. The local maximum is typically detected by measuring the light intensity of the light captured by optical fiber 510. This gross adjustment is achieved by any one of a number of manners depending on the construction of positioning device 500. In the present instance, it is achieved through regulation of yaw positioner 520 by means of screw 522 and through regulation of pitch positioner 524 by means of screw 526 to provide yaw and pitch movements which are in effect equivalent to a translatory movement of the optical beam. Alternatively, the gross adjustment can be achieved by translatory movement or ball joint manipulation of optical fiber 510.

Figure 21C:
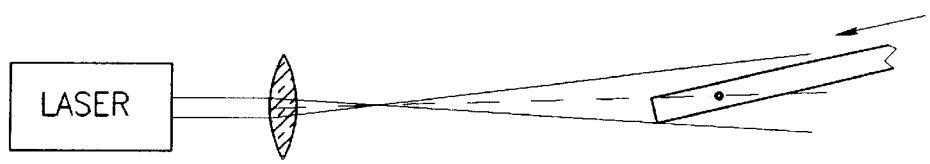

Second, as shown in FIG. 21c, the operator deploys optical fiber 510 to a new position by a translatory movement of optical fiber 510 relative to the optical beam through adjustment of rectilinear translation positioner 538. It should be noted that the translatory movement of optical is alone a path passing through the position of the local maximum found in the above-mentioned step described with reference to FIG. 21b. Typically, the operator displaces optical fiber 510 until the light intensity captured by optical fiber reaches near zero, or, in other words, as endface 508 approaches the extremity of the envelope of the optical beam issued by optical lens 504.

Figure 21D:

Third, as shown in FIG. 21d, the operator adjusts the aspect of endface 508 of optical fiber 510 by angular rotation thereof relative to the optical beam at the new position such that endface 508 is again located at a local maximum of the optical beam. It should be noted that this angular rotation is effected about an axis of rotation corresponding to the local maximum of the optical beam found in the above-mentioned step described with reference to FIG. 21b. Hence, the second local maximum is achieved when the axis of optical fiber 510 is substantially coincident to the axis of the optical beam and not to the axis of objective lens 504. This adjustment is achieved by fine regulation of yaw positioner 530 by means of screw 532 and fine regulation of pitch positioner 534 by means of screw 536.

Figure 21E:

It should be noted that the position of the global maximum of the optical beam lies along the axis extending between two local maxima found in the steps shown in FIGS. 21b and 21d. Hence, as the last step in the method, the operator deploys endface 508 of optical fiber 510 at the global maximum of the optical beam by displacing optical fiber 510 along the axis of the optical beam, as shown in FIG. 21e, by virtue of the novel translatory movement of rectilinear translation positioner 538.

While the invention has been described with respect to a limited number of embodiments, it will be appreciated that many variations, modifications and other applications of the invention may be made.

What is claimed is:

1. A positioning device for positioning a workpiece, the positioning device comprising:

(a) a base;

(b) an intermediate member;

(c) a first cross-shaped flexure connector including a pair of substantially perpendicular planar flexure members, the intersection between said flexure members defining a first axis of rotation, said base and said intermediate member deployed in a substantially diametrically opposed fashion about said first cross-shaped flexure connector so as to pivot said intermediate member relative to said base about said first axis of rotation;

(d) a first actuator for providing angular rotation of said intermediate member relative to said base about said first axis of rotation;

(e) a workpiece holder for holding the workpiece;

(f) a second cross-shaped flexure connector including a pair of substantially perpendicular planar flexure members, the intersection between said flexure members defining a second axis of rotation, said workpiece holder and said intermediate member deployed in a substantially diametrically opposed fashion about said second cross-shaped flexure connector so as to pivot said workpiece holder relative to said intermediate member about said second axis of rotation; and (g) a second actuator for providing angular rotation of said workpiece holder relative to said intermediate member about said second axis of rotation.

2. The device as in claim 1, wherein said first axis of rotation is substantially perpendicular to said second axis of rotation and wherein said first axis of rotation intersects said second axis of rotation.

3. The device as in claim 1, wherein the workpiece has at least one axis of symmetry which substantially coincides with at least one of said axes of rotation.

4. The device as in claim 1, further comprising:

(i) a second intermediate member;

(ii) a third cross-shaped flexure connector including a pair of substantially perpendicular planar flexure members, the intersection between said flexure members defining a third axis of rotation, said base and said second intermediate member deployed in a substantially diametrically opposed fashion about said third cross-shaped flexure connector so as to pivot said second intermediate member relative to said base about said third axis of rotation; and (iii) a third actuator for providing angular rotation of said second intermediate member relative to said base about said third axis of rotation.

5. The device as in claim 4, wherein said third axis of rotation is substantially perpendicular to said first axis of rotation and wherein said third axis of rotation intersects said first axis of rotation.

6. The device as in claim 4, wherein said third axis of rotation is substantially perpendicular to said second axis of rotation and wherein said third axis of rotation intersects said second axis of rotation.

7. The device as in claim 4, wherein said first axis of rotation, said second axis of rotation and said third axis of rotation are substantially mutually perpendicular to each other and wherein said first axis of rotation, said second axis of rotation and said third axis of rotation all intersect each other.

8. A positioning device for positioning a workpiece, the positioning device comprising:

(a) a base;

(b) a first member;

(c) a first cross-shaped flexure connector including a pair of substantially perpendicular planar flexure members, the intersection between said flexure members defining a first axis of rotation, said first member and said base deployed in a substantially diametrically opposed fashion about said first cross-shaped flexure connector so as to pivot said first member relative to said base about said first axis of rotation;

(d) a workpiece holder for holding the workpiece, said workpiece holder substantially parallel to said base;

(e) a second cross-shaped flexure connector including a pair of substantially perpendicular planar flexure members, the intersection between said flexure members defining a second axis of rotation, said second axis of rotation being parallel to said first axis of rotation, said workpiece holder and said first member deployed in a substantially diametrically opposed fashion about said second cross-shaped flexure connector so as to pivot said workpiece holder relative to said first member about said second axis of rotation;

(f) a second member substantially parallel with said first member;

(g) a third cross-shaped flexure connector including a pair of substantially perpendicular planar flexure members, the intersection between said flexure members defining a third axis of rotation, said third axis of rotation being parallel to said first axis of rotation, second member and said workpiece holder deployed in a substantially diametrically opposed fashion about said third cross-shaped flexure connector so as to pivot said second member relative to said workpiece holder about said third axis of rotation;

(h) a fourth cross-shaped flexure connector including a pair of substantially perpendicular planar flexure members, the intersection between said flexure members defining a fourth axis of rotation, said fourth axis of rotation being parallel to said first axis of rotation, said base and said second member deployed in a substantially diametrically opposed fashion about said fourth cross-shaped flexure connector so as to pivot said second member relative to said base about said fourth axis of rotation; and (i) a actuator for providing a translatory movement of said workpiece holder relative to said base.

9. The device as in claim 8, wherein said first member and said second member are of substantially the same length so as to facilitate a curvilinear translation of a plane associated with the workpiece.

10. The device as in claim 8, wherein said first member and said second member are of substantially different lengths so as to facilitate a rectilinear translation of a point associated with the workpiece.

11. A positioning device for aligning an optical fiber with an optical beam, the positioning device comprising:

(a) an optical device holder for holding an optical device issuing an optical beam having an optical axis; and (b) an optical fiber sub-assembly including:
  (i) an optical fiber holder for holding an end of the optical fiber so as to provide an endface for capturing at least a portion of said optical beam,
  (ii) a yaw positioner for adjusting a yaw aspect of the optical fiber relative to said optical beam,
  (iii) a pitch positioner fiber for adjusting a pitch aspect of the optical fiber relative to said optical beam, and
  (iv) a rectilinear translation positioner for providing a rectilinear translation of said endface, said rectilinear translation positioner associated with said yaw positioner such that said rectilinear translation is relative to said yaw aspect, and said rectilinear translation positioner associated with said pitch positioner such that said rectilinear translation is relative to said pitch aspect.

12. The positioning device as in claim 11, wherein said yaw positioner includes a cross-shaped flexure connector.

13. The positioning device as in claim 11, wherein said pitch positioner includes a cross-shaped flexure connector.

14. The positioning device as in claim 11, wherein said rectilinear translation positioner includes at least one cross-shaped flexure connector.

15. The positioning device as in claim 11, wherein said endface substantially lies at the intersection between the axis of rotation of said pitch positioner and the axis of rotation of said yaw positioner.

16. The positioning device in claim 11, further comprising a pitch positioner for adjusting the pitch aspect of said optical beam relative to said optical fiber sub-assembly.

17. The positioning device as in claim 11, further comprising a yaw positioner for adjusting the yaw aspect of said optical beam relative to said optical fiber sub-assembly.

18. The positioning device as in claim 11, further comprising a translation positioner for translatory movement of said optical beam relative to said optical fiber sub-assembly.

19. A method for aligning an optical fiber with an optical beam, the method comprising the steps of:

(a) positioning the optical fiber at an arbitrary position relative to the optical beam;

(b) adjusting the alignment between the optical fiber and the optical beam such that the optical fiber is located at a position indicative of a local maximum of the optical beam;

(c) deploying the optical fiber to a new position by a displacement of the optical fiber relative to the optical beam along a path passing through the local maximum from step (b);

(d) adjusting the alignment between the optical fiber and the optical beam at the new position by angular rotation of the optical fiber relative to the optical beam about the local maximum from step (b) such that the axis of the optical fiber is substantially coincident to the axis of the optical beam; and (e) deploying the optical fiber at the global maximum along the axis of the optical beam by displacing the optical fiber along the axis of the optical beam.

20. The method as in claim 19, wherein the step of adjusting the alignment between the optical fiber and the optical beam is achieved by translatory movement of the optical beam.

21. The method as in claim 19, wherein the step of adjusting the alignment between the optical fiber and the optical beam is achieved by translatory movement of the optical fiber.

22. The method as in claim 19, wherein the step of adjusting the alignment between the optical fiber and the optical beam is achieved by angular rotation of the objective lens.

23. The method as in claim 19, wherein the step of adjusting the alignment between the optical fiber and the optical beam is achieved by angular rotation of the optical fiber.

* * * * *